United States Patent
Bavishi et al.

(10) Patent No.: US 12,265,789 B2
(45) Date of Patent: Apr. 1, 2025

(54) LANGUAGE-AGNOSTIC COMPUTER PROGRAM REPAIR ENGINE GENERATOR

(71) Applicant: Microsoft Technology Licensing, LLC, Redmond, WA (US)

(72) Inventors: Rohan Jayesh Bavishi, Berkeley, CA (US); José Pablo Cambronero Sánchez, New Haven, CT (US); Anna Fariha, Redmond, WA (US); Sumit Gulwani, Sammamish, WA (US); Vu Minh Le, Redmond, WA (US); Ivan Radicek, Zagreb (HR); Daniel Galen Simmons, Sammamish, WA (US); Ashish Tiwari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 17/693,285

(22) Filed: Mar. 11, 2022

(65) Prior Publication Data
US 2023/0289523 A1    Sep. 14, 2023

(51) Int. Cl.
*G06F 40/211* (2020.01)
*G06F 8/30* (2018.01)
(Continued)

(52) U.S. Cl.
CPC .............. *G06F 40/211* (2020.01); *G06F 8/31* (2013.01); *G06F 16/3329* (2019.01); *G06F 40/284* (2020.01)

(58) Field of Classification Search
CPC .. G06F 16/3329; G06F 40/211; G06F 40/284; G06F 8/31; G06F 8/37; G06F 8/427
See application file for complete search history.

(56) References Cited

U.S. PATENT DOCUMENTS 8,843,907 B2 *  9/2014  Xu .......................... G06F 8/42
                                                    717/143
8,972,930 B2    3/2015  Gulwani
(Continued)

OTHER PUBLICATIONS

"Compiler-compiler", Retrieved From: https://en.wikipedia.org/w/index.php?title=Compiler-compiler&oldid=1075879674, Mar. 8, 2022, 12 Pages.
(Continued)

*Primary Examiner* — Abdelali Serrou
(74) *Attorney, Agent, or Firm* — Wade IP Law PLLC

(57) ABSTRACT

Techniques are described herein that are capable of creating a language-agnostic computer program repair engine generator. A context-free grammar is annotated to identify token(s) that are likely to be included in or excluded from a computer program in a manner that violates the context-free grammar. A language-agnostic computer program repair engine generator is created that is configured to generate a parser. The repair engine generator is configured to create a repair engine that: converts the candidate string into repaired strings that neither violate the context-free grammar nor violate a criterion for a valid computer program; calculates differences between the candidate string and the respective repaired strings; and replaces the candidate string with a designated repaired string based at least in part on the difference between the designated repaired string and the candidate string being less than or equal to a difference threshold.

20 Claims, 12 Drawing Sheets

(51) Int. Cl.
  *G06F 16/3329* (2025.01)
  *G06F 40/284* (2020.01)

(56) References Cited

U.S. PATENT DOCUMENTS

| | | | | |
|---|---|---|---|---|
| 9,110,676 | B2* | 8/2015 | Johnson | G06F 8/427 |
| 9,304,747 | B1* | 4/2016 | Mielenhausen | G06F 8/42 |
| 9,710,243 | B2* | 7/2017 | O'Hara | G06F 8/71 |
| 10,120,654 | B2* | 11/2018 | Bernelas | G06F 8/31 |
| 10,409,892 | B2 | 9/2019 | Rothschiller et al. | |
| 2018/0285186 | A1* | 10/2018 | Godefroid | G06F 11/3604 |

OTHER PUBLICATIONS

Hammond, et al., "A Survey on Syntactic Error Recovery and Repair", In Journal of Computer Languages, vol. 9, Issue 1, Jan. 1, 1984, pp. 51-67.

Jonge, et al., "Natural and Flexible Error Recovery for Generated Parsers", In Proceedings of Second International Conference of Software Language Engineering, Oct. 5, 2009, pp. 204-223.

"International Search Report and Written Opinion Issued in PCT Application No. PCT/US22/054027", Mailed Date: Apr. 25, 2023, 11 Pages.

Aho, et al., "Minimum Distance Error-Correcting Parser for Context-Free Languages", In SIAM Journal on Computing vol. 1, Issue 4, Dec. 1972, 9 Pages.

"Appian", Retrieved from: https://web.archive.org/web/20190101140319/https://appian.com/, Jan. 1, 2019, 4 Pages.

"Google Sheets", Retrieved from: https://web.archive.org/web/20190101123425/https://www.google.com/sheets/about/, Jan. 1, 2019, 6 Pages.

"Microsoft Excel", Retrieved from: https://web.archive.org/web/20210102003648/https://www.microsoft.com/en-us/microsoft-365/excel, Jan. 2, 2021, 5 Pages.

"Microsoft Power Apps", Retrieved from: https://web.archive.org/web/20190108083803/https://powerapps.microsoft.com/en-us/, Jan. 8, 2019, 8 Pages.

"Microsoft Power Automate", Retrieved from: https://web.archive.org/web/20190108083802/https://flow.microsoft.com/en-us/, Jan. 8, 2019, 2 Pages.

"Microsoft Power Fx", Retrieved from: https://web.archive.org/web/20210302145019/https://github.com/microsoft/Power-Fx, Mar. 2, 2021, 2 Pages.

"MrExcel Message Board", Retrieved from: https://web.archive.org/web/20191203085543/https://www.mrexcel.com/board/, Dec. 3, 2019, 3 Pages.

"OpenAI API", Retrieved from: https://beta.openai.com/examples/default-fix-python-bugs, Retrieved on: Feb. 16, 2022, 5 Pages.

"TigerJython", Retrieved from: https://web.archive.org/web/20210506194348/http://jython.tobiaskohn.ch/, May 6, 2021, 5 Pages.

"UiPath", Retrieved from: https://web.archive.org/web/20190109032542/https://www.uipath.com/, Jan. 9, 2019, 5 Pages.

"Welcome to Microsoft PowerApps Community", Retrieved from: https://web.archive.org/web/20190906125930/https://powerusers.microsoft.com/t5/PowerApps-Community/ct-p/PowerApps1, Sep. 6, 2019, 4 Pages.

Ahmed, et al., "SynFix: Automatically Fixing Syntax Errors using Compiler Diagnostics", In Repository of arXiv:2104.14671v1, Apr. 29, 2021, 11 Pages.

Bader, et al., "Getafix: Learning to Fix Bugs Automatically", In Proceedings of the ACM on Programming Languages vol. 3, Oct. 10, 2019, 27 Pages.

Yasunaga, et al., "Break-It-Fix-It: Unsupervised Learning for Program Repair", In Proceedings of the 38th International Conference on Machine Learning, Jul. 1, 2021, 12 Pages.

Yasunaga, et al., "Graph-based, Self-Supervised Program Repair from Diagnostic Feedback", In Proceedings of the 37th International Conference on Machine Learning, Nov. 21, 2020, 10 Pages.

Cerecke, Carl, "Locally Least-Cost Error Repair in LR Parsers", A thesis submitted in partial fulfilment of the requirements for the Degree of Doctor of Philosophy in the University of Canterbury, Nov. 21, 2003, 166 Pages.

Chen, et al., "Evaluating Large Language Models Trained on Code", In Repository of arXiv:2107.03374v1, Jul. 7, 2021, 35 Pages.

Corchuelo, et al., "Repairing Syntax Errors in LR Parsers", In Journal of ACM Transactions on Programming Languages and Systems vol. 24, Issue 6, Nov. 1, 2002, pp. 698-710.

Dai, et al., "Semi-supervised Sequence Learning", In Proceedings of In Advances in Neural Information Processing Systems, Dec. 7, 2015, 9 Pages.

Degano, et al., "Comparison of Syntactic Error Handling in LR Parsers", In Journal of Software Practice and Experience vol. 25, Issue 6, Jun. 1995, pp. 657-679.

Diekmann, et al., "Don't Panic! Better, Fewer, Syntax Errors for LR Parsers", In Proceedings of 34th European Conference on Object-Oriented Programming, Nov. 15, 2020, 32 Pages.

Feng, et al., "CodeBERT: A Pre-Trained Model for Programming and Natural Languages", In Proceedings of Conference on Empirical Methods in Natural Language Processing, Nov. 16, 2020, pp. 1536-1547.

Fischer, et al., "A locally Leastcost LR-error Corrector", In Technical Reports of University of Wisconsin-Madison Department of Computer Sciences, Aug. 1979, 29 Pages.

Goues, et al., "Automated Program Repair", In Journal of Communications of the ACM vol. 62, Issue 12, Nov. 21, 2019, pp. 56-65.

Gulwani, et al., "Program Synthesis", In Journal of Foundations and Trends® in Programming Languages vol. 4, Issue 1-2, Jul. 11, 2017, 126 Pages.

Gupta, et al., "DeepFix: Fixing Common C Language Errors by Deep Learning", In Proceedings of the Thirty-First AAAI Conference on Artificial Intelligence, Feb. 4, 2017, pp. 1345-1351.

Kim, et al., "Automatic Patch Generation Learned from Human-Written Patches", In Proceedings of 35th International Conference on Software Engineering, May 18, 2013, pp. 802-811.

Kim, et al., "LR Rrror Repair Using the A* algorithm", In Journal of Acta informatica, vol. 47, Issue 3, Mar. 6, 2010, pp. 179-207.

Kohn, Tobias, "The Error Behind The Message: Finding the Cause of Error Messages in Python", In Proceedings of 50th ACM Technical Symposium on Computer Science Education, Feb. 27, 2019, pp. 524-530.

Levenshtein, et al., "Binary Codes Capable of Correcting Deletions, Insertions, and Reversals", In Journal of Soviet Physics Doklady, vol. 10, Issue 8, Feb. 1, 1966, pp. 707-710.

Long, et al., "Automatic Patch Generation by Learning Correct Code", In Proceedings of the 43rd Annual ACM SIGPLAN-SIGACT Symposium on Principles of Programming, Jan. 20, 2016, pp. 298-312.

Mechtaev, et al., "Angelix: Scalable Multiline Program Patch Synthesis via Symbolic Analysis", In Proceedings of the 38th international conference on software engineering, May 14, 2016, pp. 691-701.

Monperrus, Martin, "The Living Review on Automated Program Repair", In Technical Report of hal-01956501, Dec. 15, 2020, 42 Pages.

Nguyen, et al., "SemFix: Program Repair via Semantic Analysis", In Proceedings of 35th International Conference on Software Engineering, May 18, 2013, 10 Pages.

Rajasekaran, et al., "An Error Correcting Parser For Context Free Grammars That Takes Less Than Cubic Time", In Repository of arXiv:1406.3405v1, Jun. 13, 2014, 18 Pages.

Santos, et al., "Syntax and Sensibility: Using Language Models to Detect and Correct Syntax Errors", In IEEE 25th International Conference on Software Analysis, Evolution and Reengineering, Mar. 20, 2018, pp. 311-322.

Spenke, et al., "A Language Independent Error Recovery Method for LL(1) Parsers", In Journal of Software Practice and Experience, vol. 14, Issue 11, Nov. 1984, pp. 1095-1107.

Tufano, et al., "An Empirical Investigation into Learning Bug-Fixing Patches in the Wild via Neural Machine Translation", In Proceedings of the 33rd ACM/IEEE International Conference on Automated Software Engineering, Sep. 3, 2018, pp. 832-837.

(56) References Cited

OTHER PUBLICATIONS

Weimer, et al., "Automatically Finding Patches Using Genetic Programming", In IEEE 31st International Conference on Software Engineering, May 16, 2009, pp. 364-374.

\* cited by examiner

| Faulty expression at various stages of repair |                      |
|---|---|
|                                               | Description          |
| P1: If ({IsBlank(LunchSeminar, UpdateContext(LunchSeminarVar : LunchSeminar))) | Error location : |
| P2: If ({IsBlank(LunchSeminar), UpdateContext(LunchSeminarVar : LunchSeminar))) | ADD ) |
| P3: If ({IsBlank(LunchSeminar), UpdateContext(LunchSeminarVar.LunchSeminar()))  | REPLACE : by . and ADD ( |
| P4: If ({IsBlank(LunchSeminar), UpdateContext({LunchSeminarVar : LunchSeminar})) | ADD { and REPLACE ) by } |

FIG. 6

```
1: procedure Repair(toks, G)
2:     p₀ ← tree with a single node for StartSymbol(G)
3:     s₀ ← ⟨[StartSymbol(G)$], toks, p₀, 0⟩  ▷ Initial State
4:     P ← An empty priority queue
5:     Insert s₀ into P with cost 0.
6:     while P is not empty do
7:         Pop s from P with cost c
8:         if s → accept then
9:             yield GenRepair(s)
10:        S_D ← ApplyDomainStateTransformers(s)
11:        N ← {s'' | s' → s'' ∧ s' ∈ S_D}  ▷ Rules in Figure 8
12:        if N is empty then
13:            N ← EnumerateRepairs(s)
14:        for each s' in N do
15:            Insert s' into P with cost Cost(s')
```

FIG. 7

T-Terminal-Match
$$\frac{a = t \wedge a \in \Sigma \cup \{\$\}}{\langle a : A, t : T, p, c \rangle \rightarrow \langle A, T, p, c \rangle}$$

T-Non-Terminal-Expansion
$$\frac{\begin{array}{c}(a \in V) \wedge (a \rightarrow X_1 \ldots X_k) \in R \\ t \in \mathit{First}(X_1 \ldots X_k) \vee (t \in \mathit{Follow}(a) \wedge \epsilon \in \mathit{First}(X_1 \ldots X_k)) \\ p' \text{ is obtained from p by adding } X_1 \ldots X_k \\ \text{as children of the leftmost leaf } a \text{ in p}\end{array}}{\langle a : A, t : T, p, c \rangle \rightarrow \langle [X_1, \ldots, X_k] \mathbin{+\!\!+} A, t : T, p', c \rangle}$$

T-Accept
$$\frac{}{\langle [\,], [\,], p, c \rangle \rightarrow \mathit{accept}}$$

FIG. 8

$\mathit{First}(t) = \{t\}$     if t is a terminal $\mathit{First}(X) = \mathit{First}(\gamma_1) \cup \ldots \cup \mathit{First}(\gamma_n)$     if $\forall i : X \rightarrow \gamma_i \in R$ $\mathit{First}(s\gamma) = \mathit{First}(s) \cup \mathit{First}(\gamma)$     if s can derive $\epsilon$ $\mathit{First}(s\gamma) = \mathit{First}(s)$     if s cannot derive $\epsilon$ $\mathit{Follow}(X) = \mathit{First}(\delta) \cup$ ($\mathit{Follow}(Y)$ if $\delta$ can derive $\epsilon$ else $\emptyset$)

for all $Y \rightarrow \gamma X \delta$ rules in the grammar

FIG. 9

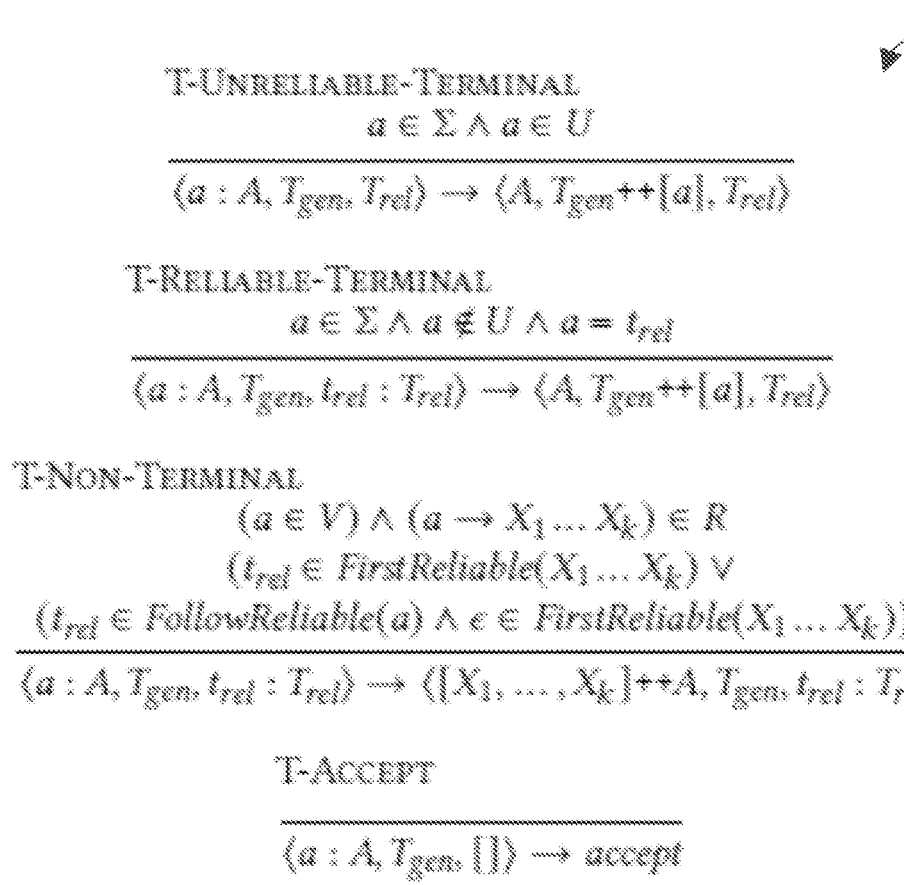

FIG. 10

$FirstReliable(t) = \{t\}$ if t is a terminal and t is reliable $FirstReliable(t) = \emptyset$ if t is a terminal and t is unreliable $FirstReliable(X) = FirstReliable(y_1) \cup \ldots \cup FirstReliable(y_n)$ where $X \to y_1 \ldots X \to y_n$ are production rules $FirstReliable(sy) = FirstReliable(s) \cup FirstReliable(y)$ if $s$ can derive $\epsilon$ else $FirstReliable(s)$ $FollowReliable(X) = FirstReliable(\delta) \cup$ $(FollowReliable(Y)$ if $\delta$ can derive $\epsilon$ else $\emptyset)$ for all $Y \to \gamma X \delta$ rules in the grammar

```
1:  procedure EnumerateRepairs(s_e)
2:      s_b, T_rel, T_tgt, T_rem ← Backtrack(s_e)
3:      P ← An empty queue
4:      Insert ⟨Stack(s_b), [], T_rel⟩ into P.
5:      repairs ← empty list
6:      while P is not empty do
7:          Pop ⟨A, T_gen, T_rel⟩ from P
8:          if ⟨A, T_gen, T_rel⟩ → accept then          ▷ Figure 10
9:              c_r ← EditDist(T_gen, T_tgt) + Cost(s_b)
10:             s_r ← ⟨Stack(s_b), T_gen++T_rem, ParseTree(s_b), c_r⟩
11:             if c_r ≤ MaxGlobalCost then
12:                 Add s_r to repairs
13:             continue
14:
15:         NextStates ← {x | ⟨A, T_gen, T_rel⟩ → x}   ▷ Figure 10
16:         for each ⟨A', T'_gen, T'_rel⟩ ∈ NextStates do
17:             ▷ Compute lower-bound on edit-distance
18:             c ← {EditDist(T'_gen, p) | p is a prefix of T_tgt}
19:             if c ≤ MaxLocalCost then
20:                 Append ⟨A', T'_gen, T'_rel⟩ to P
21:     return repairs
```

FIG. 12

T-Arity $$\frac{\begin{array}{c} a \in \{ArgsList, ArgsListTail\} \\ f = CurFunc(p) \quad n = CurNumArgs(p, f) \\ (n \geq MaxArity(f) \land t.kind \notin Follow(a)) \lor \\ n < MinArity(f) \land t.kind \in Follow(a)) \end{array}}{(a : A, t : T, p, c) \to \bot}$$

T-Combine-Tokens $$\frac{\text{Tokens } t_1 \text{ and } t_2 \text{ are eligible to be combined into } t_3 \\ \text{with cost } c'}{(A, t_1 : t_2 : T, p, c) \to (A, t_3 : T, p, c + c')}$$

T-Symbol $$\frac{a \in \{FuncName, Var\} \quad t.val \notin AvailableSymbols \\ (t', c') \in AvailableCorrections(t.val)}{(a : A, t : T, p, c) \to (a : A, t' : T, p, c + c')}$$

T-Symbol-Fail $$\frac{\begin{array}{c} a \in \{FuncName, Var\} \\ t.val \notin AvailableSymbols \quad AvailableCorrections(t.val) = \emptyset \end{array}}{(a : A, t : T, p, c) \to \bot}$$

T-Typing $$\frac{\begin{array}{c} p' = ComputeTypes(p) \\ p' \text{ has typing errors} \quad (p', c') \in ComputeTypeRepairs(p') \end{array}}{(A, T, p, c) \to (A, T, p', c + c')}$$

T-Typing-Fail $$\frac{\begin{array}{c} p' = ComputeTypes(p) \\ p' \text{ has typing errors} \quad ComputeTypeRepairs(p') = \emptyset \end{array}}{(A, T, p, c) \to \bot}$$

FIG. 15

LANGUAGE-AGNOSTIC COMPUTER PROGRAM REPAIR ENGINE GENERATOR

BACKGROUND

Developers and end-users often write computer programs that are almost correct but that include a subtle syntactic or semantic mistake. For such computer programs, it is often possible to perform a small edit (e.g., adding a delimiter) that can turn the otherwise buggy computer program into a correct computer program. A buggy computer program is a computer program that includes at least one syntactic error and/or at least one semantic error, whereas a correct computer program is a computer program that includes no syntactic errors and no semantic errors. A syntactic error in a computer program is an error that violates the syntax of the programming language in which the computer program is written. A semantic error in a computer program is an error that violates a non-syntactic criterion for a valid computer program. An example of a non-syntactic criterion is that all variable names that are used must be defined prior to their use. A valid computer program is a computer program that is capable of executing without resulting in an error.

A variety of repair systems have been proposed to correct buggy computer programs. However, each such repair system has its limitations. For instance, the repair systems traditionally are either purely symbolic or purely neural. Purely symbolic repair systems often fail to capture the naturalness of candidate repairs. Moreover, purely symbolic repair systems may produce candidate repairs that satisfy constraints such as syntax but are unlikely to be what the user desired. Purely neural repair systems do not have guarantees on their output. Accordingly, purely neural repair systems may fail to repair the original error or may introduce new mistakes.

SUMMARY

Various approaches are described herein for, among other things, creating a language-agnostic computer program repair engine generator. A computer program repair engine generator is a system that is configured to create repair engine(s). A repair engine (a.k.a. computer program repair engine) is a system that is configured to repair (e.g., correct errors in) a computer program. For instance, the repair engine may be configured to correct violations of a context-free grammar with which the computer program is associated and/or violations of criteria of a valid computer program. A context-free grammar describes the syntax of a programming language. Examples of a programming language include but are not limited to the Excel® formula language, the Python™ programming language, and the PowerFx™ programming language. A language-agnostic computer program repair engine generator is a computer program repair engine generator that is capable of creating a repair engine for an arbitrary target programming language to enable the repair engine to repair a computer program written in the arbitrary target programming language. The language-agnostic computer program repair engine generator may configure the repair engine to perform a "last-mile repair" on the computer program. A "last-mile repair" is a repair to a buggy computer program that results in one or more correct computer programs that are within a relatively small edit distance from the buggy computer program.

In an example approach, a context-free grammar is annotated with one or more annotations. The context-free grammar describes a syntax of a programming language. Each annotation identifies a token that is likely to be included in or excluded from a computer program in a manner that violates the context-free grammar. A language-agnostic computer program repair engine generator is created. The language-agnostic computer program repair engine generator is configured to generate a parser, which is configured to process strings of the computer program according to the context-free grammar by triggering calls to domain-agnostic edit operations over tokens in the computer program based on the one or more annotations and to domain-specific repair rules. Each domain-agnostic edit operation and each domain-specific repair rule indicates a change that is to be performed with regard to at least one identified token in a candidate string in the computer program based at least in part on a state (e.g., an error state) of the parser. The state of the parser indicates which tokens in the candidate string precede the at least one identified token and which rules of the context-free grammar have been applied to the candidate string prior to the change being performed with regard to the at least one identified token. The language-agnostic computer program repair engine generator is configured to create a repair engine that converts the candidate string into repaired strings that do not violate the context-free grammar and that do not violate a criterion for a valid computer program by applying, for each repaired string, one or more of the domain-agnostic edit operations and/or one or more of the domain-specific repair rules to the candidate string to satisfy the rules of the context-free grammar. A valid computer program is a computer program that is capable of executing without resulting in an error. The language-agnostic computer program repair engine generator is further configured to cause the repair engine to calculate differences between the candidate string and the respective repaired strings. The language-agnostic computer program repair engine generator is further configured to cause the repair engine to replace the candidate string with a designated repaired string, which is selected from the repaired strings, based at least in part on the difference between the designated repaired string and the candidate string being less than or equal to a difference threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 6 depicts an example faulty expression at various stages of repair in accordance with an embodiment.

FIG. 7 shows an example top-level repair engine algorithm in accordance with an embodiment.

FIGS. 8 and 10 show example transition rules for repair engine states given a grammar $G:=(V, \Sigma, R, S)$ in accordance with embodiments.

FIG. 9 depicts example equations in accordance with an embodiment.

FIG. 11 depicts example fixed-point equations for selected procedures shown in FIG. 10 in accordance with an embodiment.

FIG. 12 shows another example repair engine algorithm in accordance with an embodiment.

FIG. 15 depicts transition rules for various strategies that can be implemented in the language-agnostic computer program repair engine generator in accordance with an embodiment.

Figure 1:
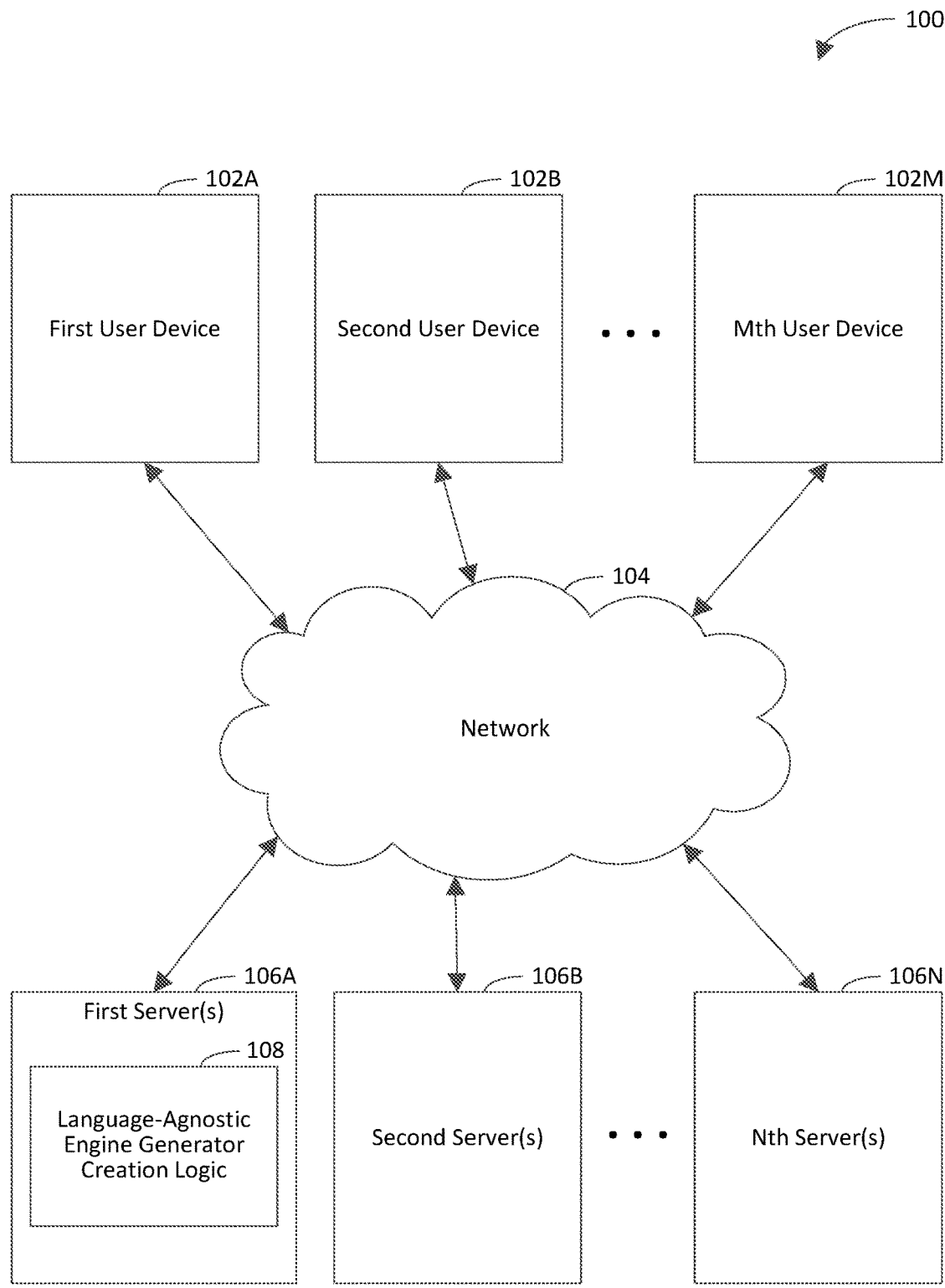
FIG. 1 is a block diagram of an example language-agnostic engine generator creation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of creating a language-agnostic computer program repair engine generator. A computer program repair engine generator is a system that is configured to create repair engine(s). A repair engine (a.k.a. computer program repair engine) is a system that is configured to repair (e.g., correct errors in) a computer program. For instance, the repair engine may be configured to correct violations of a context-free grammar with which the computer program is associated and/or violations of criteria of a valid computer program. A context-free grammar describes a syntax of a programming language. Examples of a programming language include but are not limited to the Excel® formula language, the Python™ programming language, and the PowerFx™ programming language. A language-agnostic computer program repair engine generator is a computer program repair engine generator that is capable of creating a repair engine for an arbitrary target programming language to enable the repair engine to repair a computer program written in the arbitrary target programming language. The language-agnostic computer program repair engine generator may configure the repair engine to perform a "last-mile repair" on the computer program. A "last-mile repair" is a repair to a buggy computer program that results in one or more correct computer programs that are within a relatively small edit distance from the buggy computer program.

Example techniques described herein have a variety of benefits as compared to conventional techniques for repairing computer programs. For instance, the example techniques may be capable of creating a language-agnostic computer program repair engine generator that is configured to create a repair engine that is capable of utilizing symbolic and neural techniques to repair a computer program. The example techniques may be capable of using a symbolic technique to enumerate candidate repairs and a neural technique (i.e., a deep learning model) to compare otherwise similar candidate repairs. The language-agnostic computer program repair engine generator may be configured to create a computer program repair engine that is capable of repairing violation(s) of a context-free grammar associated with a computer program and/or violation(s) of one or more criteria of a valid computer program.

The language-agnostic computer program repair engine generator may be capable of creating a repair engine for a computer program written in any suitable programming language by utilizing a context-free grammar associated with that programming language. For instance, a user may instantiate a repair engine for a desired language based on (e.g., based at least in part on) a context-free grammar for that language and domain-specific repair rules. The example techniques may be applicable to programming languages used in low-code and/or no-code settings. The example techniques may scope the task of repairing a computer program to last-mile repairs, which may substantially reduce a search space associated with possible repairs. By reducing the search space, the example techniques may be used in low latency settings (e.g., in contrast to computer program repair techniques that are based on generating and validating candidate repairs using a test suite). The example techniques may be capable of producing a repaired computer program that a user intended to write, rather than merely repairing a computer program to satisfy an external evaluator, such as the programming language's associated parser.

The example techniques may reduce an amount of time and/or resources (e.g., processor cycles, memory, network bandwidth) that is consumed to create a repair engine and/or to repair a computer program. For example, by annotating a context-free grammar and using domain-specific repair rules, changes that are to be made to tokens in a computer program may be determined. By configuring the language-agnostic computer program repair engine generator to create a repair engine to make those changes based on the rules in the context-free grammar and the domain-specific repair rules, the example techniques may avoid consuming the time and resources that otherwise would have been consumed to determine the changes to be made. Accordingly, the example techniques may increase efficiency of a computing system that is used to create a repair engine and/or to repair a computer program. The example techniques may increase efficiency of a user who uses the computing system to create the repair engine and/or to repair the computer program. For instance, using the language-agnostic computer program repair engine generator to create the repair engine may reduce an amount of time that the user spends to create the repair engine. Using the repair engine created by the language-agnostic computer program repair engine generator to repair the computer program may reduce an amount of time that the user spends to repair the computer program.

FIG. 1 is a block diagram of an example language-agnostic engine generator creation system 100 in accordance with an embodiment. Generally speaking, the language-agnostic engine generator creation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the language-agnostic engine generator creation system 100 creates a language-agnostic computer program repair engine generator. Detail regarding techniques for creating a language-agnostic computer program repair engine generator is provided in the following discussion.

As shown in FIG. 1, the language-agnostic engine generator creation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Microsoft 365® (or Excel® or Word™ therein) developed and distributed by Microsoft Corporation, Google Docs Editors™ (or Google Sheets™ or Google Docs™ therein) developed and distributed by Google Inc., and iWork® (or Numbers™ or Pages™ therein) developed and distributed by Apple Inc. In accordance with some example embodiments, the servers 106A-106N are configured to host respective Web sites, so that the Web sites are accessible to users of the language-agnostic engine generator creation system 100.

The first server(s) 106A are shown to include language-agnostic engine generator creation logic 108 for illustrative purposes. The language-agnostic engine generator creation logic 108 is configured to create a language-agnostic computer program repair engine generator. In an example implementation, the language-agnostic engine generator creation logic 108 annotates a context-free grammar with one or more annotations. The context-free grammar describes a syntax of a programming language. Each annotation identifies a token that is likely to be included in or excluded from a computer program in a manner that violates the context-free grammar. The language-agnostic engine generator creation logic 108 creates the language-agnostic computer program repair engine generator, which is configured to generate a parser. The parser is configured to process strings of the computer program according to the context-free grammar by triggering calls to domain-agnostic edit operations over tokens in the computer program based on the one or more annotations and to domain-specific repair rules. Each domain-agnostic edit operation and each domain-specific repair rule indicates a change that is to be performed with regard to at least one identified token in a candidate string in the computer program based at least in part on a state of the parser (e.g., as a result of the at least one identified token violating the context-free grammar or violating a criterion (e.g., prerequisite) for a valid computer program). A valid computer program is a computer program that is capable of executing without resulting in an error. The state of the parser indicates which tokens in the candidate string precede the at least one identified token and which rules of the context-free grammar have been applied to the candidate string prior to the change being performed with regard to the at least one identified token. The language-agnostic engine generator creation logic 108 configures the language-agnostic computer program repair engine generator to create a repair engine that converts the candidate string into repaired strings that do not violate the context-free grammar and that do not violate a criterion for a valid computer program by applying, for each repaired string, one or more of the domain-agnostic edit operations and/or one or more of the domain-specific repair rules to the candidate string to satisfy the rules of the context-free grammar. The language-agnostic engine generator creation logic 108 configures the language-agnostic computer program repair engine generator to cause the repair engine to calculate differences between the candidate string and the respective repaired strings. The language-agnostic engine generator creation logic 108 configures the language-agnostic computer program repair engine generator to cause the repair engine to replace the candidate string with a designated repaired string, which is selected from the repaired strings, based at least in part on the difference between the designated repaired string and the candidate string being less than or equal to a difference threshold.

The language-agnostic engine generator creation logic 108 may use machine learning to perform at least some of its operations. For instance, the language-agnostic engine generator creation logic 108 may use machine learning to develop and refine the language-agnostic computer program repair engine generator and/or context-free grammar(s) that are used by the language-agnostic computer program repair engine generator to create repair engine(s). The language-agnostic engine generator creation logic 108 may use machine learning to analyze the context-free grammar(s) and/or the integrated domain-specific repair rules to create the language-agnostic computer program repair engine generator.

The language-agnostic engine generator creation logic 108 may use a neural network to perform the machine learning to create the language-agnostic computer program repair engine generator. Examples of a neural network include but are not limited to a feed forward neural network and a long short-term memory (LS™) neural network. A feed forward neural network is an artificial neural network for which connections between units in the neural network do not form a cycle. In an example embodiment, the language-agnostic engine generator creation logic 108 employs a feed forward neural network to train a machine learning model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In an example, the LSTM neural network may be capable of remembering relationships between features, such as context-free grammar(s) associated with respective programming language(s), domain-specific repair rules, repair engines, candidate strings, repaired strings that are generated based on the candidate strings, rankings of the repaired strings, designated repaired strings that are selected from the repaired strings, differences between the designated repaired strings and the corresponding candidate strings, and ML-based confidences that are derived therefrom.

The language-agnostic engine generator creation logic 108 may include training logic and inference logic. The training logic is configured to train a machine learning algorithm that the inference logic uses to determine (e.g., infer) the ML-based confidences. For instance, the training logic may provide sample context-free grammar(s), sample domain-specific repair rules, sample repair engines, sample candidate strings, sample repaired strings, sample rankings of the repaired strings, sample designated repaired strings, sample differences between the designated repaired strings and the corresponding candidate strings, and sample confidences as inputs to the algorithm to train the algorithm. The sample data may be labeled. The machine learning algorithm may be configured to derive relationships between the features (e.g., context-free grammar(s), domain-specific repair rules, repair engines, candidate strings, repaired strings that are generated based on the candidate strings, rankings of the repaired strings, designated repaired strings that are selected from the repaired strings, and differences between the designated repaired strings and the corresponding candidate strings) and the resulting ML-based confidences. The inference logic is configured to utilize the machine learning algorithm, which is trained by the training logic, to determine the ML-based confidence when the features are provided as inputs to the algorithm.

The language-agnostic engine generator creation logic 108 may be implemented in various ways to create a language-agnostic computer program repair engine generator, including being implemented in hardware, software, firmware, or any combination thereof. For example, the language-agnostic engine generator creation logic 108 may be implemented as computer program code configured to be executed in one or more processors. In another example, at least a portion of the language-agnostic engine generator creation logic 108 may be implemented as hardware logic/electrical circuitry. For instance, at least a portion of the language-agnostic engine generator creation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The language-agnostic engine generator creation logic 108 may be partially or entirely incorporated in a cloud computing service, though the example embodiments are not limited in this respect.

The language-agnostic engine generator creation logic 108 is shown to be incorporated in the first server(s) 106A for illustrative purposes and is not intended to be limiting. It will be recognized that the language-agnostic engine generator creation logic 108 (or any portion(s) thereof) may be incorporated in any one or more of the user devices 102A-102M. For example, client-side aspects of the language-agnostic engine generator creation logic 108 may be incorporated in one or more of the user devices 102A-102M, and server-side aspects of language-agnostic engine generator creation logic 108 may be incorporated in the first server(s) 106A. In another example, the language-agnostic engine generator creation logic 108 may be distributed among the user devices 102A-102M. In yet another example, the language-agnostic engine generator creation logic 108 may be incorporated in a single one of the user devices 102A-102M. In another example, the language-agnostic engine generator creation logic 108 may be distributed among the server(s) 106A-106N. In still another example, the language-agnostic engine generator creation logic 108 may be incorporated in a single one of the servers 106A-106N.

Figure 2:
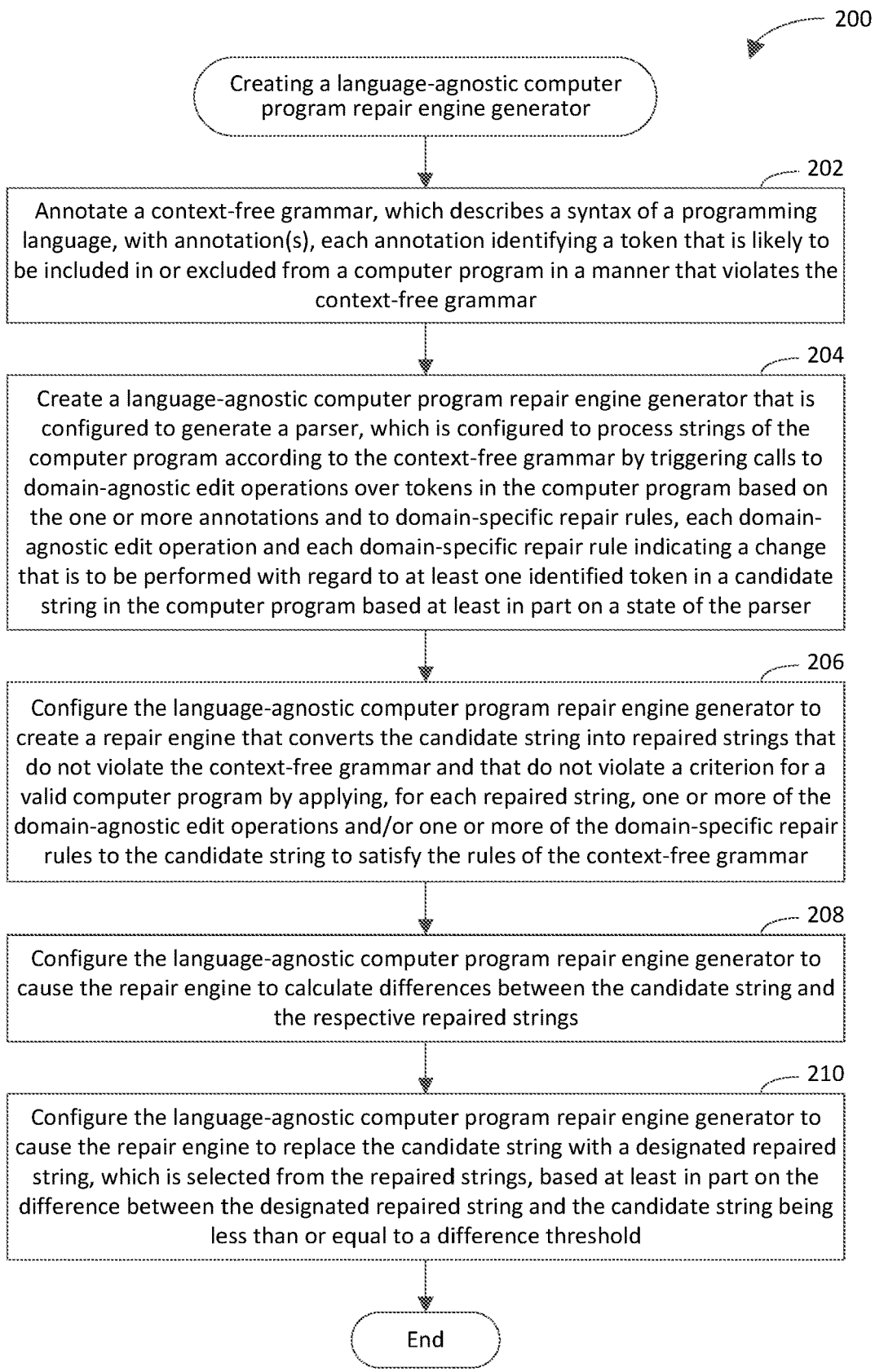
FIG. 2 depicts a flowchart of an example method for creating a language-agnostic computer program repair engine generator in accordance with an embodiment.
Figure 3:
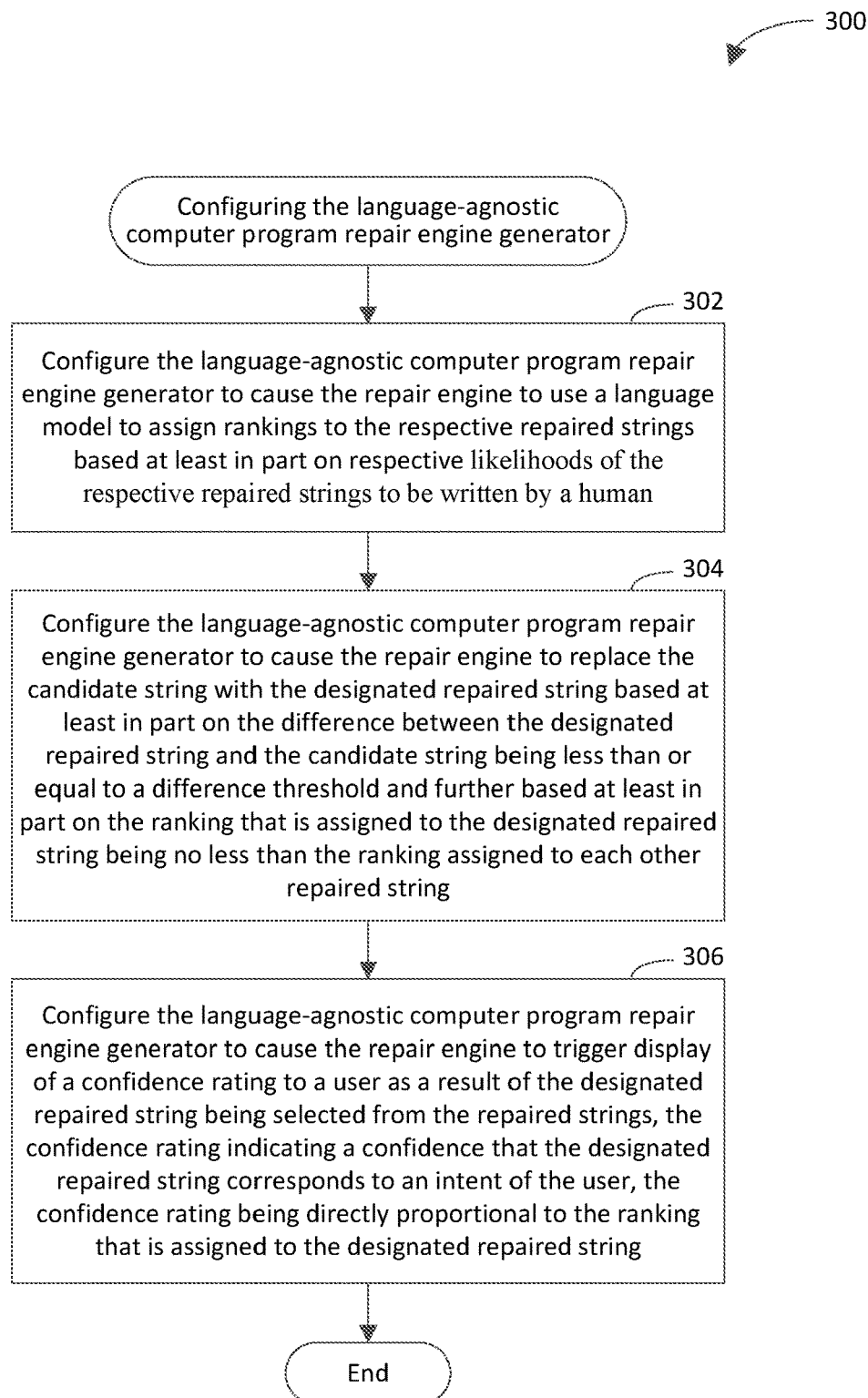
FIG. 3 depicts a flowchart of an example method for configuring the language-agnostic computer program repair engine generator in accordance with an embodiment.
Figure 4:
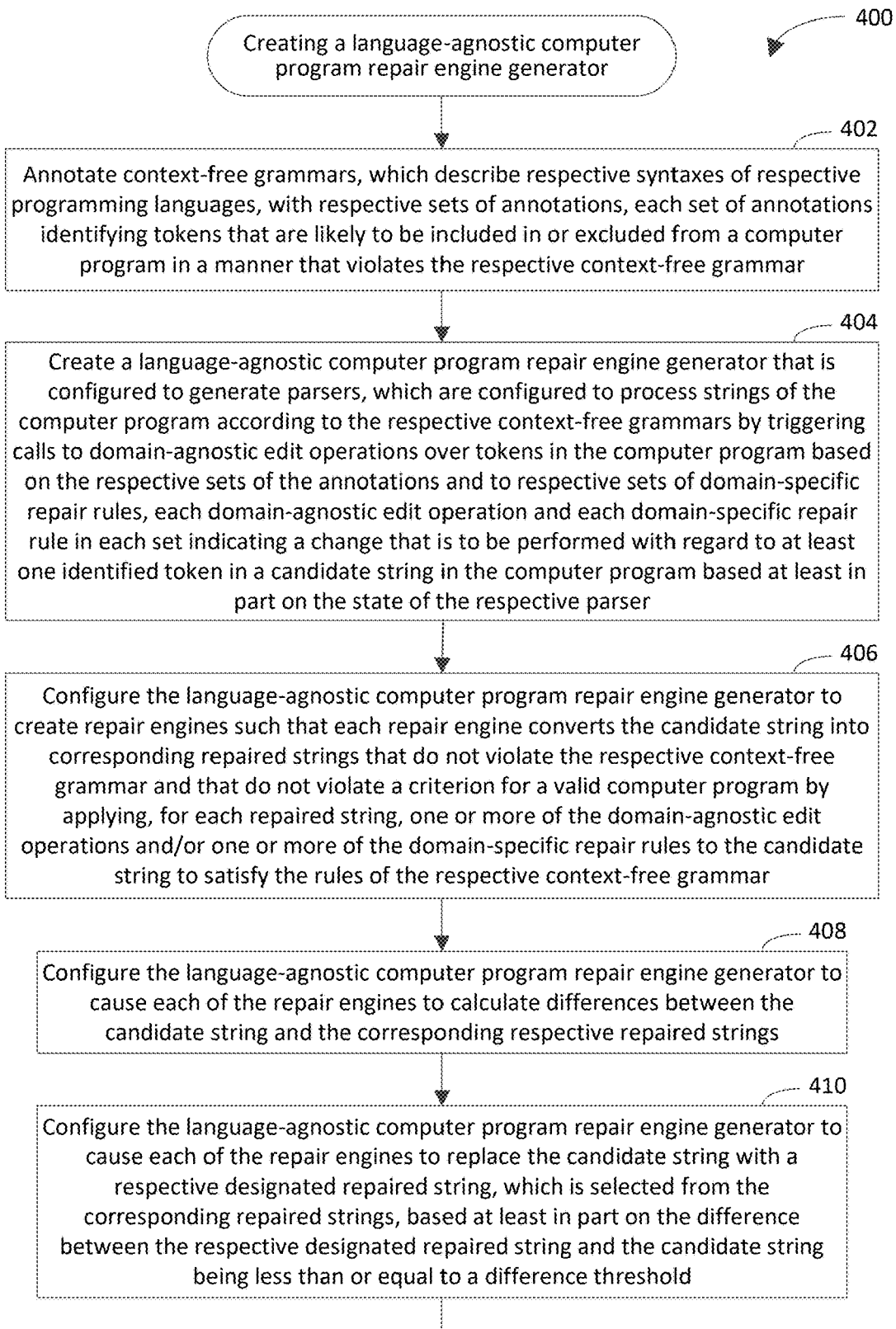
FIG. 4 depicts a flowchart of another example method for creating a language-agnostic computer program repair engine generator in accordance with an embodiment.
Figure 5:
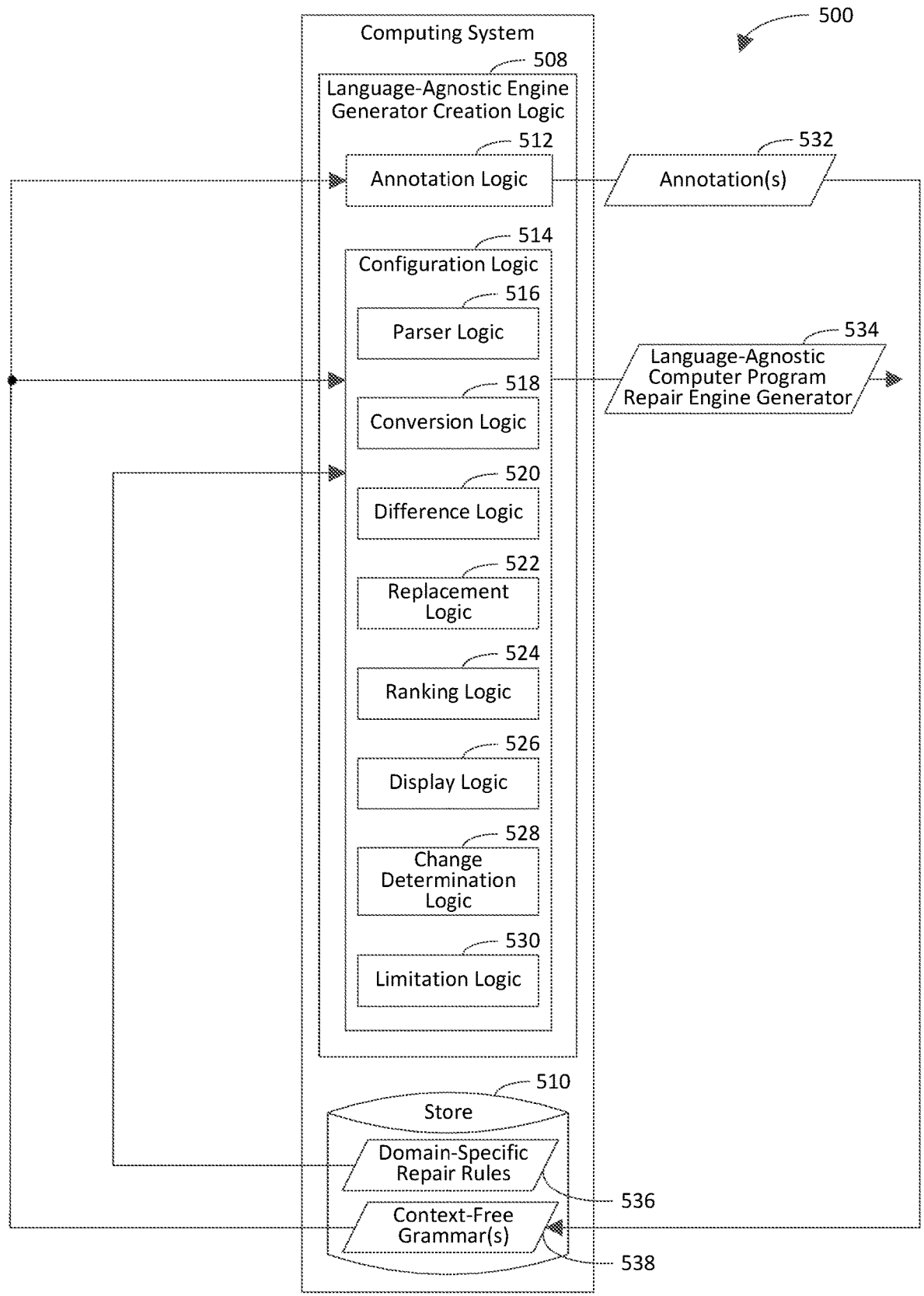
FIG. 5 is a block diagram of an example computing system in accordance with an embodiment.

FIG. 2 depicts a flowchart 200 of an example method for creating a language-agnostic computer program repair engine generator in accordance with an embodiment. FIG. 3 depicts a flowchart 300 of an example method for configuring the language-agnostic computer program repair engine generator in accordance with an embodiment. FIG. 4 depicts a flowchart 400 of another example method for creating a language-agnostic computer program repair engine generator in accordance with an embodiment. Flowcharts 200, 300, and 400 may be performed by the first server(s) 106A shown in FIG. 1, for example. For illustrative purposes, flowcharts 200, 300, and 400 are described with respect to computing system 500 shown in FIG. 5, which is an example implementation of the first server(s) 106A. As shown in FIG. 5, the computing system 500 includes language-agnostic engine generator creation logic 508 and a store 510. The language-agnostic engine generator creation logic 508 includes annotation logic 512 and configuration logic 514. The configuration logic 514 includes parser logic 516, conversion logic 518, difference logic 520, replacement logic 522, ranking logic 524, display logic 526, change determination logic 528, and limitation logic 530. The store 510 may be any suitable type of store. One type of store is a database. For instance, the store 510 may be a relational database, an entity-relationship database, an object database, an object relational database, an extensible markup language (XML) database, etc. The store 510 is shown to store context-free grammar(s) 532 for non-limiting, illustrative purposes. The context-free grammar(s) 538 will be referred to as a single context free grammar in the discussion of flowcharts 200 and 300 and will be referred to as multiple context-free grammars in the discussion of flowchart 400 for non-limiting, illustrative purposes. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, a context-free grammar, which describes a syntax of a programming language, is annotated with one or more annotations. Each annotation identifies a token that is likely to be included in or excluded from a computer program in a manner that violates the context-free grammar. Examples of a token include but are not limited to a single character and a combination of characters. For instance, a token may be a punctuation mark. Examples of a punctuation mark include but are not limited to a dot (e.g., period), a comma, a colon, a semicolon, a parenthesis, a curly brace, a bracket, a tilde, a dash, a double-dash, a space, a question mark, an exclamation mark, and a vertical bar. In an example implementation, the annotation logic 512 annotates a context-free grammar 538, which describes a syntax of a programming language, with annotation(s) 532. Each of the annotation(s) 532 identifies a token that is likely to be included in or excluded from a computer program in a manner that violates the context-free grammar 538.

At step 204, a language-agnostic computer program repair engine generator is created. The language-agnostic computer program repair engine generator is configured to generate a parser, which is configured to process strings of the computer program according to the context-free grammar by triggering calls to domain-agnostic edit operations over tokens in the computer program based on the one or more annotations and to domain-specific repair rules. Each domain-agnostic edit operation and each domain-specific repair rule indicates a change that is to be performed with regard to at least one identified token in a candidate string in the computer program based at least in part on a state of the parser (e.g., as a result of the at least one identified token violating the context-free grammar or violating a criterion for a valid computer program). Examples of a change that may be performed with regard to at least one identified token in a candidate string include but are not limited to inserting the at least one identified token into the candidate string, deleting the at least one identified token from the candidate string, replacing the at least one identified token in the candidate string with at least one different token, and replacing one or more tokens in the candidate string with the at least one identified token (e.g., combining the one or more tokens into a single identified token). It will be recognized that a domain-agnostic edit operation is applicable to arbitrary domains, whereas a domain-specific repair rule is applicable to a specific domain. A valid computer program is a computer program that is capable of executing without errors, as determined by a criterion supplied to the system. For example, the valid computer program may be capable of being compiled. A criterion for a valid computer program may be a prerequisite that must be satisfied by a computer program in order for the computer program to be valid. Violating a criterion for a valid computer program may include using a number of arguments in a function call that is different from a number that is required by the criterion, combining multiple tokens to form a single token, misspelling a term (e.g., a variable name), using a synonym of a term, or attempting to perform a disallowed operation on one or more values (e.g., attempting to add a number to a string or text). The state of the parser indicates which tokens in the candidate string precede the at least one identified token and which rules of the context-free grammar have been applied to the candidate string prior to the change being performed with regard to the at least one identified token.

In an example embodiment, at least one of the domain-specific repair rules indicates a change that is to be performed with regard to the at least one identified token in the candidate string in the computer program based at least in part on the state of the parser as a result of the at least one identified token violating the context-free grammar.

In another example embodiment, at least one of the domain-specific repair rules indicates a change that is to be performed with regard to the at least one identified token in the candidate string in the computer program based at least in part on the state of the parser as a result of the at least one identified token violating a criterion for a valid computer program.

In an example implementation, the configuration logic 514 creates a language-agnostic computer program repair engine generator 534. For instance, the parser logic 516, which is included in the configuration logic 514, may create the language-agnostic computer program repair engine generator 534. The parser logic 516 configures the language-agnostic computer program repair engine generator 534 to generate the parser, which is configured to process strings of the computer program according to the context-free grammar 538 by triggering calls to domain-agnostic edit operations over tokens in the computer program based on the one or more annotations 536 and to domain-specific repair rules 536. Each domain-agnostic edit operation and each of the domain-specific repair rules 536 indicates a change that is to be performed with regard to at least one identified token in a candidate string in the computer program based at least in part on the state of the parser. In accordance with this implementation, the state of the parser indicates which tokens in the candidate string precede the at least one identified token and which rules of the context-free grammar 538 have been applied to the candidate string prior to the change being performed with regard to the at least one identified token.

At step 206, the language-agnostic computer program repair engine generator is configured to create a repair engine that converts the candidate string into repaired strings that do not violate the context-free grammar and that do not violate a criterion for a valid computer program by applying, for each repaired string, one or more of the domain-agnostic edit operations and/or one or more of the domain-specific repair rules to the candidate string to satisfy the rules of the context-free grammar. In an example implementation, the conversion logic 518 configures the language-agnostic computer program repair engine generator 534 to cause (e.g., configure) the repair engine to convert the candidate string into repaired strings that do not violate the context-free grammar 538 and that do not violate a criterion for a valid computer program by applying, for each repaired string, one or more of the domain-agnostic edit operations and/or one or more of the domain-specific repair rules 536 to the candidate string to satisfy the rules of the context-free grammar 538.

At step 208, the language-agnostic computer program repair engine generator is configured to cause the repair engine to calculate differences between the candidate string and the respective repaired strings. In an example implementation, the difference logic 520 configures the language-agnostic computer program repair engine generator 534 to cause the repair engine to calculate differences between the candidate string and the respective repaired strings.

At step 210, the language-agnostic computer program repair engine generator is configured to cause the repair engine to replace the candidate string with a designated repaired string, which is selected from the repaired strings, based at least in part on the difference between the designated repaired string and the candidate string being less than or equal to a difference threshold. In an example implementation, the replacement logic 522 configures the language-agnostic computer program repair engine generator 534 to cause the repair engine to replace the candidate string with the designated repaired string.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes configuring the language-agnostic computer program repair engine generator to cause the repair engine to limit which of the tokens in the candidate string are to be analyzed for compliance with the rules in the context-free grammar to a subsequence of the tokens in the candidate string. A subsequence of a first sequence of tokens is a second sequence that is capable of being derived from the first sequence by deleting one or more of the tokens without changing an order of the remaining tokens. For instance, a second sequence A, C, D, E is a subsequence of a first sequence A, B, C, D, E, F, where the second sequence is achieved by removing B and F from the first sequence. Accordingly, the subsequence of the tokens in the candidate string includes fewer than all of the tokens in the candidate string. The subsequence is based at least in part on a relative position of each token in the candidate string that is annotated with at least one of the one or more annotations. In an example implementation, the limitation logic 530 configures the language-agnostic computer program repair engine generator 534 to cause the repair engine to limit which of the tokens in the candidate string are to be analyzed for compliance with the rules in the context-free grammar 538 to a subsequence of the tokens in the candidate string.

In another example embodiment, the method of flowchart 200 further includes configuring the language-agnostic computer program repair engine generator to cause the repair engine to trigger display of the designated repaired string to a user as a result of the designated repaired string being selected from the repaired strings. In an example implementation, the display logic 526 configures the language-agnostic computer program repair engine generator 534 to cause the repair engine to trigger display of the designated repaired string.

In yet another example embodiment, the method of flowchart 200 further includes configuring the language-agnostic computer program repair engine generator to cause the repair engine to trigger display of a confidence rating to a user as a result of the designated repaired string being selected from the repaired strings. The confidence rating indicates a confidence that the designated repaired string corresponds to an intent of the user. The confidence rating is inversely proportional to the difference between the designated repaired string and the candidate string. In an example implementation, the display logic 526 configures the language-agnostic computer program repair engine generator 534 to cause the repair engine to trigger display of the confidence rating.

In still another example embodiment, the method of flowchart 200 further includes configuring the language-agnostic computer program repair engine generator to cause the repair engine to use a language model to determine the change that is to be performed with regard to the at least one identified token in the candidate string in the computer program based at least in part on the state of the parser. For instance, use of the language model to determine the change may be performed as a result of the at least one identified token violating the context-free-grammar or violating a criterion for a valid computer program. In an example implementation, the change determination logic 528 configures the language-agnostic computer program repair engine generator 534 to cause the repair engine to use the language model to determine the change that is to be performed with regard to the at least one identified token in the candidate string in the computer program.

In another example embodiment, the method of flowchart 200 includes one or more of the steps shown in flowchart 300 of FIG. 3. For instance, one or more of the steps shown in flowchart 300 may be performed in lieu of step 210 of flowchart 200. As shown in FIG. 3, the method of flowchart 300 begins at step 302. In step 302, the language-agnostic computer program repair engine generator is configured to cause the repair engine to use a language model to assign rankings to the respective repaired strings based at least in part on respective likelihoods of the respective repaired strings to be written by a human. For example, the language model may be configured to indicate a likelihood of a repaired string to be written by a human based on the repaired string being provided as an input to the language model. A relatively higher likelihood for a repaired string to be written by a human may correspond to a relatively higher ranking being assigned to the repaired string. A relatively lower likelihood for a repaired string to be written by a human may correspond to a relatively lower ranking being assigned to the repaired string. In an example implementation, the ranking logic 524 configures the language-agnostic computer program repair engine generator 534 to cause the repair engine to use the language model to assign the rankings to the respective repaired strings.

At step 304, the language-agnostic computer program repair engine generator is configured to cause the repair engine to replace the candidate string with the designated repaired string based at least in part on the difference between the designated repaired string and the candidate string being less than or equal to a difference threshold and further based at least in part on the ranking that is assigned to the designated repaired string being no less than the ranking assigned to each other repaired string. In an example implementation, the replacement logic 522 configures the language-agnostic computer program repair engine generator 534 to cause the repair engine to replace the candidate string with the designated repaired string.

At step 306, the language-agnostic computer program repair engine generator is configured to cause the repair engine to trigger display of a confidence rating to a user as a result of the designated repaired string being selected from the repaired strings. For instance, triggering the display of the confidence rating may include causing the confidence rating to be displayed, providing an instruction (e.g., to a display device) to display the confidence rating, and/or initiating the display of the confidence rating. The confidence rating indicates a confidence that the designated repaired string corresponds to an intent of the user. The confidence rating is directly proportional to the ranking that is assigned to the designated repaired string. In an example implementation, the display logic 526 configures the language-agnostic computer program repair engine generator 534 to cause the repair engine to trigger display of the confidence rating to the user as a result of the designated repaired string being selected from the repaired strings.

As shown in FIG. 4, the method of flowchart 400 begins at step 402. In step 402, context-free grammars, which describe respective syntaxes of respective programming languages, are annotated with respective sets of annotations. Each set of annotations identifies tokens that are likely to be included in or excluded from a computer program in a manner that violates the respective context-free grammar. In an example implementation, the annotation logic 512 annotates context-free grammars 538, which describe respective syntaxes of respective programming languages, with respective sets of the annotation(s) 532. Each set of the annotation(s) 532 identifies tokens that are likely to be included in or excluded from a computer program in a manner that violates the respective context-free grammar.

At step 404, a language-agnostic computer program repair engine generator is created that is configured to generate parsers, which are configured to process strings of the computer program according to the respective context-free grammars by triggering calls to domain-agnostic edit operations over tokens in the computer program based on the respective sets of the annotations and to respective sets of domain-specific repair rules. Each domain-agnostic edit operation and each domain-specific repair rule in each set indicates a change that is to be performed with regard to at least one identified token in a candidate string in the computer program based at least in part on a state of the respective parser (e.g., as a result of the at least one identified token violating the respective context-free grammar or violating a criterion for a valid computer program). The state of each parser indicates which tokens in the candidate string precede the at least one identified token and which rules of the respective context-free grammar have been applied to the candidate string prior to the change being performed with regard to the at least one identified token. In an example implementation, the configuration logic 514 creates the language-agnostic computer program repair engine generator 534. For instance, the parser logic 516, which is included in the configuration logic 514, may create the language-agnostic computer program repair engine generator 534. In accordance with this implementation, the parser logic 516 configures the language-agnostic computer program repair engine generator 534 to generate the parser.

At step 406, the language-agnostic computer program repair engine generator is configured to create repair engines such that each repair engine converts the candidate string into corresponding repaired strings that do not violate the respective context-free grammar and that do not violate a criterion for a valid computer program by applying, for each repaired string, one or more of the domain-agnostic edit operations and/or one or more of the domain-specific repair rules to the candidate string to satisfy the rules of the respective context-free grammar. In an example implementation, the conversion logic 518 configures the language-agnostic computer program repair engine generator 534 to create the repair engines.

At step 408, the language-agnostic computer program repair engine generator is configured to cause each of the repair engines to calculate differences between the candidate string and the corresponding respective repaired strings. In an example implementation, the conversion logic 518 configures the language-agnostic computer program repair engine generator 534 to cause each of the repair engines to calculate differences between the candidate string and the corresponding respective repaired strings.

At step 410, the language-agnostic computer program repair engine generator is configured to cause each of the repair engines to replace the candidate string with a respective designated repaired string, which is selected from the corresponding repaired strings, based at least in part on the difference between the respective designated repaired string and the candidate string being less than or equal to a difference threshold. In an example implementation, the difference logic 520 configures the language-agnostic computer program repair engine generator 534 to cause each of the repair engines to replace the candidate string with a respective designated repaired string.

It will be recognized that the computing system 500 may not include one or more of the language-agnostic engine generator creation logic 508, the store 510, the annotation logic 512, the configuration logic 514, the parser logic 516, the conversion logic 518, the difference logic 520, the replacement logic 522, the ranking logic 524, the display logic 526, the change determination logic 528, and/or the limitation logic 530. Furthermore, the computing system 500 may include components in addition to or in lieu of the language-agnostic engine generator creation logic 508, the store 510, the annotation logic 512, the configuration logic 514, the parser logic 516, the conversion logic 518, the difference logic 520, the replacement logic 522, the ranking logic 524, the display logic 526, the change determination logic 528, and/or the limitation logic 530.

The example embodiments described herein may be incorporated into a "low-code/no-code" platform. Examples of a "low-code/no-code" platform include but are not limited to a spreadsheet (e.g., Excel®, Google Sheets™), a robotic process automation framework (e.g., Power Automate®, UIPath®), and an enterprise application (e.g., PowerApps®, Appian™). The example embodiments may be incorporated into such a "low-code/no-code" platform to create a language-agnostic computer program repair engine generator that is configured to create a repair engine that is configured to repair small programs or formulas that are used to perform operations on the platform. The example embodiments may be utilized in a programming-education context in which a student starts by creating a small program (e.g., introductory Structured Query Language (SQL) and Python™ courses).

Although some platforms expose commonly used functionalities via drop-down menus in a user interface, users of the platforms may write formulas in their domain-specific languages to accomplish nontrivial tasks. It may be challenging for nonexpert users to author such formulas, especially during the last-mile stretch where the formulas may be almost correct but still require a few tweaks to be fully correct.

FIG. 6 depicts an example faulty expression 600 at various stages of repair in accordance with an embodiment. The faulty expression is represented as a PowerFx™ formula for illustrative purposes. Referring to the initial faulty expression, P1, the user is trying to update the context by assigning to LunchSeminarVar the value of LunchSeminar if the latter is not empty. P1 includes errors, and the compiler points to the colon ":" as the culprit location. However, the actual error is not at that location. Novices often struggle to fix such buggy formulas. This is because the error(s) are not immediately evident if the formula is not properly formatted, and web applications often lack support for syntax highlighting. The situation is exacerbated when the buggy formula is large, making the process of spotting the bugs and debugging them a daunting task.

It should be noted that not all errors in formulas are due to typographical mistakes. In P1, for example, one of the errors happened because the user was not aware that a key-value pair needs to be enclosed within curly braces "{" and "}". Furthermore, mistakes do not always result in syntax errors. For example, if the key-value pair in P1 is replaced within curly braces, the syntax errors are resolved, but type errors (and arity errors) remain. For instance, the If function requires two or three arguments of appropriate types.

The correct formula, P4, is three edits away from P1 and can be obtained by: (1) inserting a parenthesis ")" after LunchSeminar, (2) inserting an opening brace "{" before the key-value pair, and (3) replacing the closing parenthesis ")" after the key-value pair by a closing brace "}".

In an example implementation, repair engines created by the language-agnostic computer program repair engine generator are modified LL parsers. An LL parser is a pushdown automaton that maintains a stack of nonterminal and terminals, while consuming tokens from the input string. The repair engines may scan the input string from the left and try to generate all possible leftmost derivations for the string in the grammar. Each repair engine may operate like a normal LL parser with the following modifications: (1) If the parser reaches a failure state, then instead of stopping, the repair engine backtracks and attempts to insert or delete the "unreliable" tokens. (2) Each time the parser's internal state is updated, an external call to the (appropriate) repair rule is made, which can optionally change the parser's state.

In the example of FIG. 2, the unreliable terminals correspond to punctuation tokens (e.g., parentheses, curly braces, brackets, dots, commas, and colons). While parsing P1, when the first comma is processed, a domain-specific rule is triggered that enforces arity of IsBlank to be 1 by inserting a closing parenthesis. Thus, P1 is turned into P2. Arity analysis is one example domain-specific insight that may be incorporated into the example embodiments. Other examples include rules that fix misspelled function or variable names.

The repair engine follows the steps of a regular parser until it hits the token colon ":". At this point, the parser backtracks to the point where the dth last reliable token was consumed. Here, d is a parameter whose value lies in [1-4]. Since LunchSeminarVar and UpdateContext (identifiers) are reliable, if d=2, the repair engine backtracks to the point after UpdateContext is consumed. The repair engine then tries several repairs that add and/or remove punctuation tokens. Following this methodology, the repair engine generates candidates P3 and P4. Since P3 and P4 both are at a token-edit distance 3 from P1, the repair engine breaks the tie using a finetuned language model to find P4 as the most natural repair.

For purposes of illustration, let T be a target engine (e.g., a compiler, an interpreter, or a run-time engine) that accepts or rejects programs. Informally, given a string s, representing an ill-formed program, we seek to transform (fix) s to another string ŝ that is accepted by T. Several values of ŝ may exist, but we want the one that the user most likely intended.

Let us formalize the problem statement above. We first need to formalize the target engine T. In most real-world scenarios, a complete formal specification of the set of strings accepted by T is unknown. For example, T could be the Excel™ formula execution server, or something that has evolved organically over many years.

However, we can obtain (or create) a context-free grammar G that accepts a large and useful subset of the language accepted by T. A context-free grammar may be represented as a quadruple $G:=(V, \Sigma, R, S)$, where V is the set of non-terminals, $\Sigma$ is the set of terminals, $R \subset V \times (V \cup \Sigma)^*$ is the set of production rules, and $S \in V$ is a special start symbol. A string $s \in \Sigma^*$ is accepted by G, or in the language defined by G, denoted by $s \in L(G)$, if there exists a derivation of s in G. A derivation of s is a sequence of strings $S \to S_1 \to \ldots \to S_k \to S$, where each $S_i \in (V \cup \Sigma)^*$, and for each $S_i \to S_j$, $S_j$ is obtained by replacing a non-terminal X in $S_i$ with $X_1, \ldots, X_n$ where each $X_i \in (V \cup \Sigma)$ and $(X \to X_1 \ldots X_n) \in R$.

Alongside G, we can create a set of context-sensitive constraints C that are satisfied by all programs accepted by T. A constraint C E C is a mapping: $\Sigma^* \mapsto B$. Constraints capture requirements that (1) well-formed programs must satisfy, and (2) are not captured by G. Some examples are: (a) programs should be type correct, (b) every used variable should be defined before, and (c) every function or operator name should match one of the names supported by T. Together, the grammar G and the constraints C serve as a proxy for T.

The second challenge is to model the user intent, i.e., quantifying the likelihood of a candidate fix being the one that the user intends. We want to maximize the probability Pr(ŝ|s) which quantifies the probability that ŝ is the user-intended program given that the user wrote s. Our assumption is that the user usually composes a program that is "close" to what the user intends. To quantify "closeness", we can use any distance metric dist on strings. In this example, we use token edit distance and require a distance threshold δ that specifies the required closeness. Among programs that are within a distance of δ from s, we model that $Pr(\hat{s}|s)$ is proportional to the prior likelihood, namely $Pr(\hat{s})$, of observing $\hat{s}$.

Now we can formalize the problem statement as follows. Given a grammar G:=(V, Σ, R, S), constraints C:Σ*↦B, a distance measure dist: Σ*×Σ*↦R⁺, a distance threshold δ, and a string s∈Σ*, the last-mile repair problem seeks to find a string $\hat{s}$∈Σ' such that
1. $\hat{s}$∈L(G) and C($\hat{s}$)=true,
2. dist (s,$\hat{s}$)≤δ,
3. $\hat{s}$=argmax X∈{x s.t. dist(x,s)≤δ} Pr(X), where Pr is the probability distribution over human-composed strings in T.

Intuitively, we want to find a string $\hat{s}$ as a repair that is "close" (according to distance function dist and the distance threshold δ) to the buggy program s, while making sure that it is "valid" (i.e., validated using the grammar G and the constraints C). In case of ties, we break it by leveraging the probability distribution of "natural" programs that real users compose, defined by Pr.

We will now describe how the language-agnostic computer program repair engine generator can be instantiated to generate repair engines for different target languages. The class of possible repairs can be large, and consequently, the search space of potential repairs can be quite substantial. Therefore, we will focus on classes that represent a large set of common mistakes that low-code/no-code users make when authoring programs in the target language. This information can be target-specific and may be captured using the concept of unreliable terminals and domain-specific parser state transforms. While unreliable terminals capture pure syntax errors that users may make, domain-specific parser state transformers allow us to incorporate more semantics-guided fixes in the language-agnostic computer program repair engine generator.

Let G:=(V, Σ, R, S) be the grammar. The language-agnostic computer program repair engine generator may further assume access to the following: (1) A set U⊂Σ of unreliable terminals: A subset of the terminals is classified as unreliable based on their likelihood of being erroneously omitted or included in user-authored buggy formulas. For example, in formula languages, parentheses and/or punctuation marks are observed to be unreliable because users often misplace them in expressions. (2) A set of domain-specific parser state transformations, where each transformation takes a parser state and returns a set of (modified) parser states. We will later see examples of these transformations.

In an example implementation, the language-agnostic computer program repair engine generator may be characterized as an error-correcting LL parser for the grammar G. In accordance with this implementation, the main differences from a regular LL parser are the following:
1. rather than produce a single parse, the error-correcting parser explores and produces multiple parses;
2. the error-correcting parser mimics a regular parser at every step until the regular parser reaches a failure state—at which point it instead tries to recover by backtracking to a previous state;
3. the error-correcting parser thereafter proceeds by trusting the reliable terminals and not trusting the unreliable terminals;
4. at every step, the error-correcting parser also may call the parser state transformers to get new parser states; and
5. the error-correcting parser limits the number of repairs it considers in one parse by tracking the edits (cost) it has already made (incurred) on the input string.

Next, we formalize this intuitive description of the error-correcting parser. We describe the error-correcting parser using inference rules. The inference rules operate on parser states. Given a grammar G:=(V, Σ, R, S), a parser state may be represented by a 4-tuple ⟨A, T, p, c⟩, where A is the parsing stack, T is the stream of remaining tokens that are to be processed, p is the parse-tree constructed so far, and c is the cost of the state. The parsing stack A is represented as a list, with the first element of the list corresponding to the top of the stack. Similarly, T is also represented as a list, with the first element being the next immediate token. For convenience, we use Stack(s), RemTokens(s), ParseTree(s), and Cost(s) to refer to the parsing stack, remaining tokens, the parse-tree, and the cost of a search-state s, respectively.

Let G:=(V, Σ, R, S) and the input string be s. Let toks denote the tokenization of s represented as a list of tokens. The initial state of the error-correcting parser is ([S, $], toks, $p_0$, 0), where $ is the end-of-sequence symbol, $p_0$ is parse tree containing just a single (root) node S, and cost is 0. Starting from this initial state, the inference rules describe how states are updated. In some cases, multiple rules may be applicable, or the same rule may result in multiple states. In these cases, the interpretation is that of a non-deterministic choice—the actual implementation may consider all possibilities and may explore all states.

FIG. 7 shows an example top-level repair engine algorithm 700 in accordance with an embodiment. The algorithm 700 may represent a specific strategy for applying the aforementioned inference rules. Given the list of tokens corresponding to a buggy string s, and a grammar G, the algorithm 700 returns a list of repairs. The $ symbol corresponds to the end-of-stream token. GenRepair(s) convers the parse tree of state s back into a string.

The goal is to start with the initial state and reach the special state, accept, which is the terminating state for the algorithm. Any state of the form ([ ], [ ], p, c), for any parse tree p and cost c, rewrites to the accept state shown in FIG. 8, which is described in further detail below. Informally, starting from ([S, $], toks, $p_0$, 0), where toks is a tokenization of input string s, if we reach ([ ], [ ], p, c), then p will be a parse of some string $\hat{s}$ obtained by repairing s, and c will be dist ($\hat{s}$, s) (the cost of the repair).

At a high level, the algorithm 700 explores the search space using transition rules (a.k.a. inference rules) 800 shown in FIG. 8. The algorithm 700 maintains a priority queue of states, ordered by their costs, as indicated at line 4 of the algorithm 700.

The priority queue is initialized to contain just the initial state, as indicated at line 3 of the algorithm 700. Every time the algorithm 700 encounters a state corresponding to an accept state, it translates the parse-tree into a repair and returns the repair to the user, as indicated at lines 8-9 of the algorithm 700. Otherwise, the algorithm 700 applies domain-specific strategies to obtain a set of new states, as indicated at line 10 of the algorithm 700. Domain-specific strategies are discussed in further detail below. The next step is to compute the set of next states using the transition rules 800 of FIG. 8, as indicated in line 11 of the algorithm 700. If this set is empty, an error state has been encountered because no progress can be made, as indicated in line 12 of the algorithm 700. The algorithm 700 then goes into repair mode. The algorithm 700 uses a sub-procedure EnumerateRepairs, which is discussed in further detail below, to apply a correction on the error state and put it back in the search queue, as indicated at line 13 of the algorithm 700.

The transition rules 800 of FIG. 8 describe a standard LL parser. The transition T-Terminal-Match handles the case when the top of stack is a token that matches the next token in the input stream. The transition T-Non-TerminalExpansion replaces a nonterminal X at the top of stack by the list of elements from the right-hand side of some production rule based on the lookahead. The standard helper functions, Follow and First, used in this rule are obtained using fix-point computation over equations 900 shown in FIG. 9. It should be noted that these two functions may be pre-computed for a grammar.

If we use only the transition rules 800 of FIG. 8, we will get a standard LL parser. We extend the rule set by the transition rules 1000 shown in FIG. 10 to convert the LL parser into an error-correcting parser. FIG. 11 depicts example fixed-point equations for the procedures FirstReliable and FollowReliable, which are shown in FIG. 10, in accordance with an embodiment. Symbols: and ++ in FIG. 10 correspond to Haskell-style list prepend and append syntax. FIG. 12 shows another example repair engine algorithm 1200, which may be used to apply the aforementioned new extension rules, in accordance with an embodiment. This strategy may be incorporated into the top-level algorithm 700 shown in FIG. 7 to provide an overall strategy for solving the last-mile repair problem.

The algorithm 700 of FIG. 7 calls the function EnumerateRepairs to repair an erroneous state, which is described by the algorithm 1200 of FIG. 12. We use $\tau(s)=(s_0, \ldots, s)$ to refer to the trace of s (i.e., to the sequence of states resulting from repeated application of the transition rules 800 of FIG. 8 starting from the initial state so, as detailed in the algorithm 700, and ending at s. The trace is a history of parser states that we assume the algorithm saves. A token t is deemed to be unreliable if t.value==a for some unreliable terminal a (i.e., when the value attribute of the token corresponds to an unreliable terminal).

Figures 13, 14:
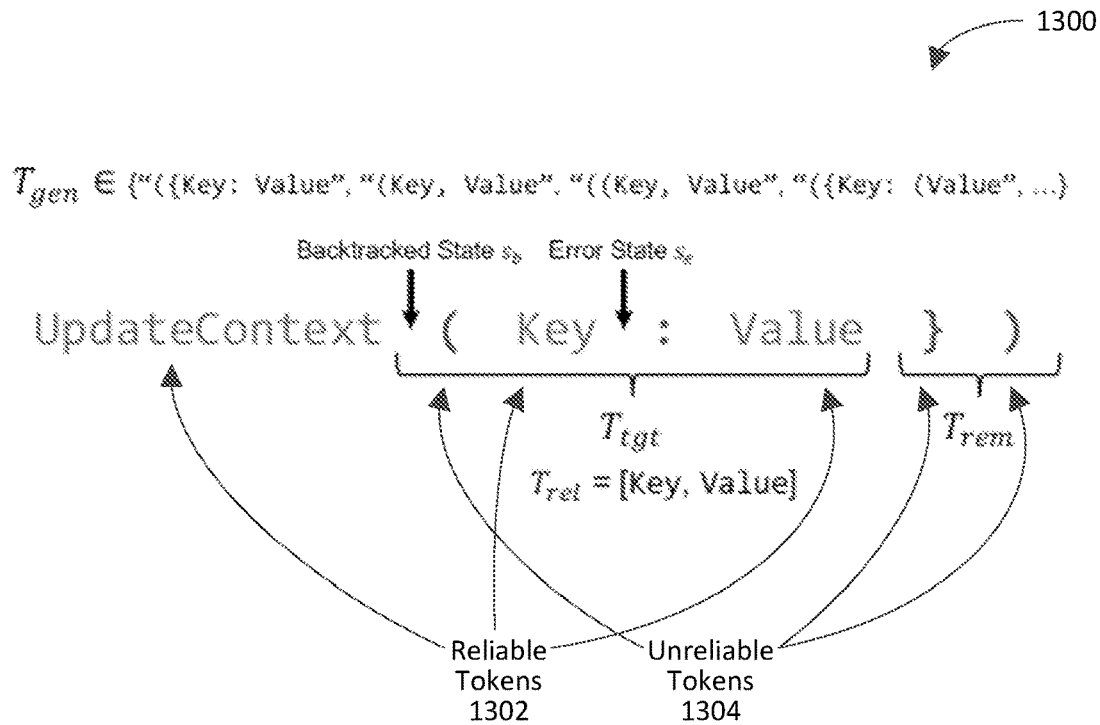
FIG. 13 is an example illustration of repair enumeration in accordance with an embodiment.
FIG. 14 depicts an example fragment of grammar that may be used for Excel® and PowerFx™ languages corresponding to function calls and expressions in accordance with an embodiment.

Given an erroneous search state $s_e$, the first step involves backtracking to an ancestral state $s_b \in \tau(s_e)$. The state $s_b$ corresponds to the state in $\tau(s_e)$ where the dth previous reliable token was added to the parse-tree of $s_e$, or if no such state exists, $s_b$ is the first state in $\tau(s_e)$. Backtracking will now be described in further detail with reference to an example illustration 1300 of repair enumeration shown in FIG. 13. FIG. 13 shows reliable tokens 1302 and unreliable tokens 1304. The reliable tokens 1302 include "UpdateContext", "Key", and "Value". The unreliable tokens 1304 include "(", ":", "}", and ")". In FIG. 13, the error state $s_e$ corresponds to the point after Key is consumed. With d=2, the backtracked state $s_b$ corresponds to the point after UpdateContext is consumed. The constant d refers to the backtracking depth, which is a hyper-parameter that essentially controls the kinds of repairs that can be generated.

$T_{tgt}$, $T_{rem}$, and $T_{rel}$ refer to three special lists of tokens. Let $t_r$ be the first reliable token in Tokens($s_e$). $T_{tgt}$ is the list of tokens in Tokens($s_b$) up until and including $t_r$. Note that Tokens($s_e$) is guaranteed to be a suffix of Tokens($s_b$). $T_{rem}$ is the list of tokens after and excluding $t_r$ in Tokens($s_e$). $T_{rel}$ is the list of all reliable tokens, in order, in $T_{tgt}$. This logic is encapsulated within the Backtrack procedure in line 2 of the algorithm 1200 shown in FIG. 12. In FIG. 13, $T_{tgt}$ corresponds to the four tokens (, Key, :, and Value. $T_{rem}$ is the list of tokens following Value. $T_{rel}$ is the list of two reliable tokens in $T_{tgt}$ (i.e., Key and Value). The significance of these three lists will now be discussed.

EnumerateRepairs returns all states sr that are the same as $s_b$ except for their remaining token sequences, where $T_{tgt}$ is replaced by a new sequence of tokens $T_{gen}$, as indicated at line 10 of the algorithm 12 in FIG. 12. $T_{gen}$ satisfies the constraint that it can be obtained from $T_{tgt}$ by inserting and/or deleting unreliable tokens. Additionally, the parsing stacks of the repaired states $s_r$ are guaranteed to be able to derive the string corresponding to $T_{gen}$ as a prefix. FIG. 12 shows a few possibilities for $T_{gen}$ that are generated by the algorithm 1200.

EnumerateRepairs enables enumeration of valid $T_{gen}$. This is achieved by repeated application of the transition rules 1000 shown in FIG. 10. The first rule states that if the top of the stack is an unreliable terminal, add it to the generated token sequence so far. The second rule covers the case when the top of the stack is reliable; in this case, it must match against the next expected reliable token as per $T_{rel}$. The third rule governs the production rules chosen to expand the top of the stack when it is a non-terminal. This is analogous to the non-terminal rule in the standard parsing transition rules 800 shown in FIG. 8. The only difference is the use of FirstReliable and FollowReliable. These two functions are similar to their standard counterparts First and Follow used in FIG. 8. The only difference is that they are only concerned with reliable terminals, not all terminals.

However, recall that, as per the last-mile repair definition, we do not want just any $T_{gen}$ that is possible. It must be within some edit-distance of the original. Thus, we ensure that the edit-distance, as indicated at lines 9-11 of the algorithm 1200 shown in FIG. 12, is less than the hyper-parameters MaxGlobalCost, or its lower-bound estimate, as indicated at lines 18-19 of the algorithm 1200, is less than the hyper-parameter MaxLocalCost, which ensures that repairs adhere to the δ requirement from the problem definition mentioned above.

The repairs generated by the algorithm 1200 shown in FIG. 12 guarantee that a parse can proceed. They are purely syntax repairs (e.g., involving the insertion or deletion of unreliable tokens). In a low-code/no-code setting, users may struggle with other classes of semantic errors (e.g., symbol errors, type errors, incorrect arity). The language-agnostic computer program repair engine generator allows for the incorporation of domain-specific repair strategies via parser state transformers to tackle these classes of errors, as captured by the call to ApplyDomainStateTransformers in line 10 of the algorithm 700 shown in FIG. 7. Transformers are essentially a collection of hand-crafted transition rules, that create new parser states from a given state, or flag a state as an error state, denoted as ⊥. Given the input parser state, the ApplyDomainStateTransformers function simply returns the set of states obtained by applying all the eligible transition rules, or an empty set if the input state is flagged as an error state by any of the rules.

FIG. 14 depicts an example fragment of grammar 1400 that may be used for Excel® and PowerFx™ languages corresponding to function calls and expressions in accordance with an embodiment. FIG. 15 depicts transition rules 1500 for various strategies that can be implemented in the language-agnostic computer program repair engine generator in accordance with an embodiment. The transition rules 1500 are based on the grammar fragment 1400 shown in FIG. 14. The symbol ⊥ denotes an error state. Four example domain-specific strategies will now be described.

Domain-Specific Strategy 1: Arity Analysis. Most formulas in languages like PowerFx™ and Excel® use built-in functions, which have a fixed minimum and maximum arity. The IsBlank function in the motivating example in FIG. 6 has a minimum and maximum arity of 1. Thus, repairing P1 in FIG. 6 involves inserting a parenthesis after the first argument to IsBlank, which is LunchSeminar.

The rule T-Arity in FIG. 15 captures the arity analysis strategy that allows for such repairs. Essentially, given an input parser state, it first computes the current unclosed function $f$, and the number of arguments parsed so far for $f$, denoted by n, by analyzing the parse-tree p using the convenience functions CurFunc and CurNumArgs, respectively. Then, it flags the input parser state as an error state if the top of the stack is either ArgsList or ArgsListTail, as shown in FIG. 14, and one of two cases hold: (1) n≥MaxArity($f$), and the next token is going to force the parse of another argument, and (2) n<MinArity($f$), and the next token does not indicate the start of a new argument. A determination can be made whether a new argument is to be parsed by checking the membership of the kind of the next token against the Follow set of the non-terminal at the top of the stack, as described in the rule T-Non-Terminal-Expansion shown in FIG. 8.

Because the input parser state is flagged as an error state, this would invoke EnumerateRepairs in line 13 of the algorithm 700 shown in FIG. 7. Thus, this strategy is able to fix arity errors by inserting and/or deleting unreliable tokens (e.g., punctuation). Note that this strategy may not suggest repairs where default or placeholder arguments are generated to satisfy the arity constraints.

Domain-Specific Strategy 2: Combining Tokens. Another common class of errors in our domains involves incorrect tokenization due to presence of extra whitespace. For example, if a space is included between the < and =symbols, the whole string may be tokenized into two separate tokens, instead of the more likely <=(less-than-equal) token. In our domains, these binary operators are reliable terminals/tokens; hence, the algorithm 1200 shown in FIG. 12 may not be capable of generating repairs for such errors.

The strategy is formalized as the rule T-Combine-Tokens shown in FIG. 15, which states that if the next two tokens are eligible to be combined into a new token with cost c', return a new state in which the two are combined and c' is added to the cost. Thus, this strategy directly modifies the remaining token stream. This rule may be used to combine tokens corresponding to relational operators such as <=, ==, and >=.

Domain-Specific Strategy 3: Fixing Symbol Errors. This strategy helps generate repairs for errors where function names or variables are misspelled (e.g., IsBlnk instead of IsBlank), or synonyms for functions are used (e.g., Length instead of Len).

The strategy is formalized as the rule T-Symbol in FIG. 15. If the top of the stack corresponds to the non-terminals FuncName or Var in the grammar shown in FIG. 14, and the next token t's value is not present in the set of available symbols, denoted by AvailableSymbols, and a corrected token 't is available with cost c', then a new state is returned where the next token is replaced with t'. The set of symbols AvailableSymbols is determined from the runtime context within the GUI/IDE interface to the underlying domain. The function AvailableCorrections returns available symbols within a threshold edit-distance of the value of the original token t, which captures the misspelling case, and built-in functions that are known synonyms of the value of t. If no such correction is available, then the state is flagged as an error state in accordance with the rule T-Symbol-Fail shown in FIG. 15. Note that this will invoke EnumerateRepairs but none of its repairs would fix the issue and overall, no repairs would be returned by the algorithm 700 shown in FIG. 7.

Domain-Specific Strategy 4: Fixing Type Errors. This strategy helps generate repairs for typing errors. For instance, types are computed for the parse-tree of the input parse state, and if there is a type error, one of two things can happen: (1) if a repair is available in terms of a fixed parse-tree with cost c', then a new state is returned with the fixed parse tree and an additional cost of c', and (2) if a repair is not available, the state is flagged as an error state. The scenarios are captured by rules T-Typing and T-Typing-Fail, respectively, as shown in FIG. 15. Note that a repair on a parse-tree applies to a node that is completely parsed (i.e., it has no non-terminal leaf nodes). An example of a repair is explicit type conversion, such as converting an int to a string to enable concatenation with another string.

The algorithm 700 shown in FIG. 7 is guaranteed to return the repairs in increasing order of cost, which is the edit-distance from the original buggy program in this example implementation. However, a scenario may arise in which there are multiple repairs with the allowable edit-distance, in which case the most natural repairs may be selected to show to the user. A pre-trained language model may be fine-tuned to approximate the probability distribution of whether a formula is likely to be written by a user. The language model may be pre-trained on millions of aligned natural language and code snippets extracted from a Github® repository across programming languages such as Javascript®, Python™, and Java™, and is thus suitable for modeling code.

A simple way to fine-tune the language model would be to train it with the causal-LM objective (i.e., train it to predict a formula one token at a time, by taking into account the tokens generated so far). Then the product of the associated probabilities with every generated token can be used for ranking the formula. A large dataset of well-formed formulas that can enable such training may not be available for PowerFx™ and Excel®. In this case, a simpler and more targeted objective may be devised to successfully train the model.

In an example implementation, the bulk of the algorithm is focused towards producing repairs involving insertion and/or deletion of unreliable tokens (e.g., punctuation). In accordance with this implementation, the causal-LM objective can be restricted to only train the model to predict contiguous unreliable sequences given the list of tokens before and after the target sequence. The frequency distribution of punctuation tokens may be substantially skewed. For instance, a parenthesis may occur more frequently than a curly brace. Thus, training with this objective over the available well-formed formulas may introduce a bias in the models towards more frequently occurring tokens. Therefore, this task may be divided further into predicting a single unreliable token given the prefix and suffix lists of tokens, turning it into a classification task, where the training dataset can be appropriately balanced by under-sampling and over-sampling. To rank repairs, the sum of the negative log-probabilities for each unreliable token predicted as part of a repair can be used as its score, which then can be used to break ties.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the language-agnostic engine generator creation logic 108, the language-agnostic engine generator creation logic 508, the annotation logic 512, the configuration logic 514, the parser logic 516, the conversion logic 518, the difference logic 520, the replacement logic 522, the ranking logic 524, the display logic 526, the change determination logic 528, the limitation logic 530, flowchart 200, flowchart 300, and/or flowchart 400 may be implemented in hardware, software, firmware, or any combination thereof.

For example, any one or more of the language-agnostic engine generator creation logic 108, the language-agnostic engine generator creation logic 508, the annotation logic 512, the configuration logic 514, the parser logic 516, the conversion logic 518, the difference logic 520, the replacement logic 522, the ranking logic 524, the display logic 526, the change determination logic 528, the limitation logic 530, flowchart 200, flowchart 300, and/or flowchart 400 may be implemented, at least in part, as computer program code configured to be executed in one or more processors.

In another example, any one or more of the language-agnostic engine generator creation logic 108, the language-agnostic engine generator creation logic 508, the annotation logic 512, the configuration logic 514, the parser logic 516, the conversion logic 518, the difference logic 520, the replacement logic 522, the ranking logic 524, the display logic 526, the change determination logic 528, the limitation logic 530, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 16:
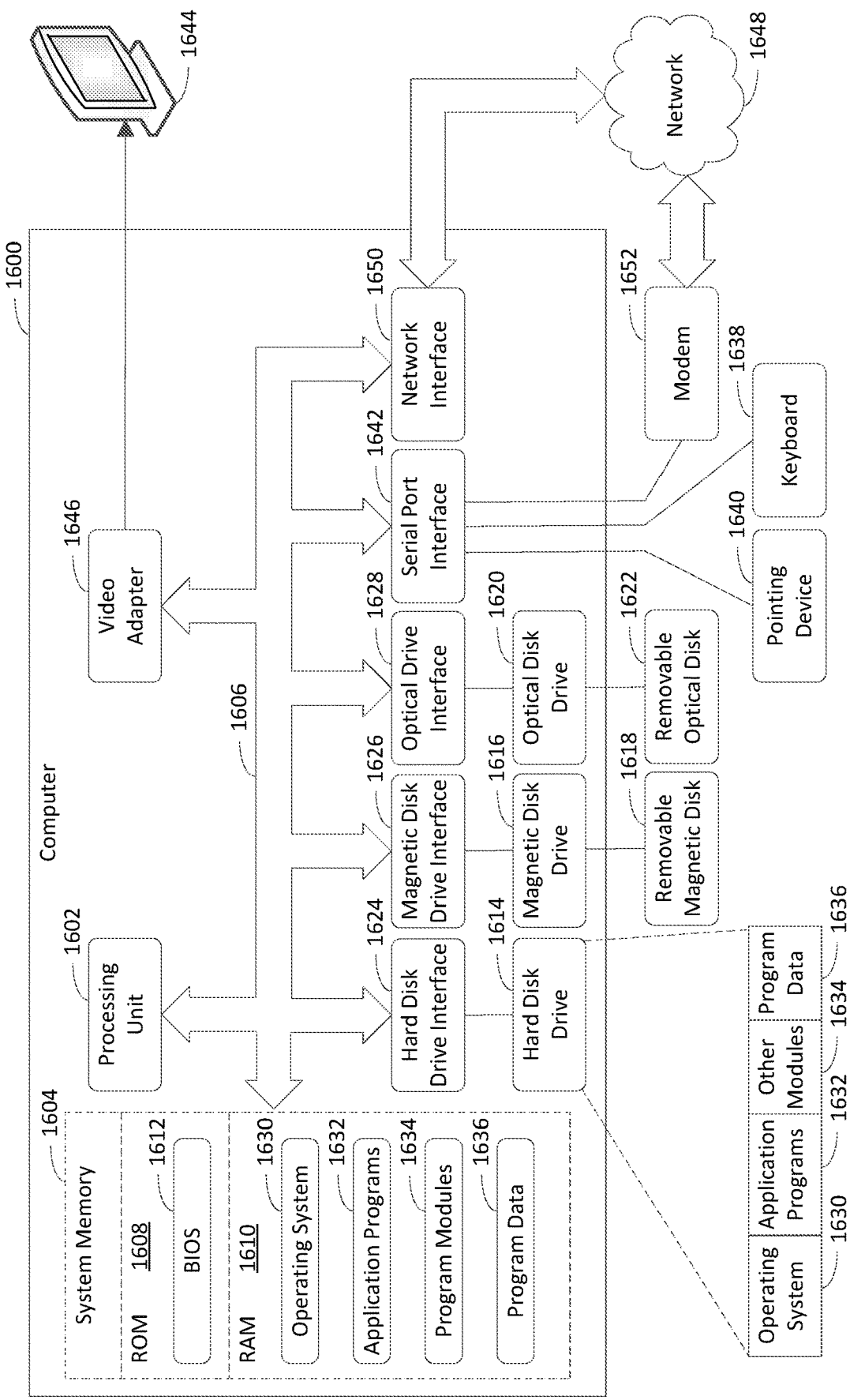
FIG. 16 depicts an example computer in which embodiments may be implemented.

III. Further Discussion of Some Example Embodiments (A1) An example system (FIG. 1, 102A-102M or 106A-106N; FIG. 5, 500; FIG. 16, 1600) comprises a memory (FIG. 16, 1604, 1608, 1610) and one or more processors (FIG. 16, 1602) coupled to the memory. The one or more processors are configured to annotate (FIG. 2, 202) a context-free grammar (FIG. 5, 538), which describes a syntax of a programming language, with one or more annotations (FIG. 5, 532). Each annotation identifies a token that is likely to be included in or excluded from a computer program in a manner that violates the context-free grammar. The one or more processors are further configured to create (FIG. 2, 204) create a language-agnostic computer program repair engine generator (FIG. 5, 534) that is configured to generate a parser, which is configured to process strings of the computer program according to the context-free grammar by triggering calls to domain-agnostic edit operations over tokens in the computer program based on the one or more annotations and to domain-specific repair rules (FIG. 5, 536). Each domain-agnostic edit operation and each domain-specific repair rule indicates a change that is to be performed with regard to at least one identified token in a candidate string in the computer program based at least in part on a state of the parser. The state of the parser indicates which tokens in the candidate string precede the at least one identified token and which rules of the context-free grammar have been applied to the candidate string prior to the change being performed with regard to the at least one identified token. The one or more processors are further configured to configure (FIG. 2, 206) the language-agnostic computer program repair engine generator to create a repair engine that converts the candidate string into a plurality of repaired strings that do not violate the context-free grammar and that do not violate a criterion for a valid computer program by applying, for each repaired string, at least one of one or more of the domain-agnostic edit operations or one or more of the domain-specific repair rules to the candidate string to satisfy the rules of the context-free grammar. The one or more processors are further configured to configure (FIG. 2, 208) the language-agnostic computer program repair engine generator to cause the repair engine to calculate a plurality of differences between the candidate string and the plurality of respective repaired strings. The one or more processors are further configured to configure (FIG. 2, 210) the language-agnostic computer program repair engine generator to cause the repair engine to replace the candidate string with a designated repaired string, which is selected from the plurality of repaired strings, based at least in part on the difference between the designated repaired string and the candidate string being less than or equal to a difference threshold.

(A2) In the example system of A1, wherein at least one domain-specific repair rule indicates a change that is to be performed with regard to the at least one identified token in the candidate string in the computer program based at least in part on the state of the parser as a result of the at least one identified token violating the context-free grammar.

(A3) In the example system of any of A1-A2, wherein at least one domain-specific repair rule indicates a change that is to be performed with regard to the at least one identified token in the candidate string in the computer program based at least in part on the state of the parser as a result of the at least one identified token violating a criterion for a valid computer program.

(A4) In the example system of any of A1-A3, wherein the processing system is configured to: configure the language-agnostic computer program repair engine generator to cause the repair engine to use a language model to assign a plurality of rankings to the plurality of respective repaired strings based at least in part on a plurality of respective likelihoods of the plurality of respective repaired strings to be written by a human; and configure the language-agnostic computer program repair engine generator to cause the repair engine to replace the candidate string with the designated repaired string further based at least in part on the ranking that is assigned to the designated repaired string being no less than the ranking assigned to each other repaired string in the plurality of repaired strings.

(A5) In the example system of any of A1-A4, wherein the processing system is further configured to: configure the language-agnostic computer program repair engine generator to cause the repair engine to trigger display of a confidence rating to a user as a result of the designated repaired string being selected from the plurality of repaired strings. The confidence rating indicates a confidence that the designated repaired string corresponds to an intent of the user. The confidence rating is directly proportional to the ranking that is assigned to the designated repaired string.

(A6) In the example system of any of A1-A5, wherein the processing system is further configured to: configure the language-agnostic computer program repair engine generator to cause the repair engine to use a language model to determine the change that is to be performed with regard to the at least one identified token in the candidate string in the computer program based at least in part on the state of the parser.

(A7) In the example system of any of A1-A6, wherein the processing system is configured to: annotate a plurality of context-free grammars, which describe a plurality of respective syntaxes of a plurality of respective programming languages, with a plurality of respective sets of annotations, each set of annotations identifying tokens that are likely to be included in or excluded from a computer program in a manner that violates the respective context-free grammar; and create a language-agnostic computer program repair engine generator that is configured to generate a plurality of parsers, which are configured to process strings of the computer program according to the plurality of respective context-free grammars by triggering calls to domain-agnostic edit operations over tokens in the computer program based on the plurality of respective sets of the annotations and to a plurality of respective sets of domain-specific repair rules, each domain-agnostic edit operation and each domain-specific repair rule in each set indicating a change that is to be performed with regard to at least one identified token in a candidate string in the computer program based at least in part on the state of the respective parser. The state of each parser indicates which tokens in the candidate string precede the at least one identified token and which rules of the respective context-free grammar have been applied to the candidate string prior to the change being performed with regard to the at least one identified token.

(A8) In the example system of any of A1-A7, wherein the processing system is configured to: configure the language-agnostic computer program repair engine generator to create a plurality of repair engines such that each repair engine converts the candidate string into a corresponding plurality of repaired strings that do not violate the respective context-free grammar and that do not violate a criterion for a valid computer program by applying, for each repaired string, at least one of one or more of the domain-agnostic edit operations or one or more of the domain-specific repair rules to the candidate string to satisfy the rules of the respective context-free grammar; configure the language-agnostic computer program repair engine generator to cause each of the plurality of repair engines to calculate a plurality of differences between the candidate string and the corresponding plurality of respective repaired strings; and configure the language-agnostic computer program repair engine generator to cause each of the plurality of repair engines to replace the candidate string with a respective designated repaired string, which is selected from the corresponding plurality of repaired strings, based at least in part on the difference between the respective designated repaired string and the candidate string being less than or equal to a difference threshold.

(A9) In the example system of any of A1-A8, wherein the processing system is further configured to: configure the language-agnostic computer program repair engine generator to cause the repair engine to limit which of the tokens in the candidate string are to be analyzed for compliance with the rules in the context-free grammar to a subsequence of the tokens in the candidate string. The subsequence includes fewer than all of the tokens in the candidate string. The subsequence is based at least in part on a relative position of each token in the candidate string that is annotated with at least one of the one or more annotations.

(A10) In the example system of any of A1-A9, wherein the processing system is further configured to: configure the language-agnostic computer program repair engine generator to cause the repair engine to trigger display of the designated repaired string to a user as a result of the designated repaired string being selected from the plurality of repaired strings.

(A11) In the example system of any of A1-A10, wherein the processing system is further configured to: configure the language-agnostic computer program repair engine generator to cause the repair engine to trigger display of a confidence rating to a user as a result of the designated repaired string being selected from the plurality of repaired strings. The confidence rating indicates a confidence that the designated repaired string corresponds to an intent of the user. The confidence rating is inversely proportional to the difference between the designated repaired string and the candidate string.

(B1) An example method implemented by a computing system (FIG. 1, 102A-102M or 106A-106N; FIG. 5, 500; FIG. 16, 1600). The method comprises annotating (FIG. 2, 202) a context-free grammar (FIG. 5, 538), which describes a syntax of a programming language, with one or more annotations (FIG. 5, 532). Each annotation identifies a token that is likely to be included in or excluded from a computer program in a manner that violates the context-free grammar. The method further comprises creating (FIG. 2, 204) a language-agnostic computer program repair engine generator (FIG. 5, 534) that is configured to generate a parser, which is configured to process strings of the computer program according to the context-free grammar by triggering calls to domain-agnostic edit operations over tokens in the computer program based on the one or more annotations and to domain-specific repair rules (FIG. 5, 536). Each domain-agnostic edit operation and each domain-specific repair rule indicates a change that is to be performed with regard to at least one identified token in a candidate string in the computer program based at least in part on a state of the parser. The state of the parser indicates which tokens in the candidate string precede the at least one identified token and which rules of the context-free grammar have been applied to the candidate string prior to the change being performed with regard to the at least one identified token. The method further comprises configuring (FIG. 2, 206) the language-agnostic computer program repair engine generator to create a repair engine that converts the candidate string into a plurality of repaired strings that do not violate the context-free grammar and that do not violate a criterion for a valid computer program by applying, for each repaired string, at least one of one or more of the domain-agnostic edit operations or one or more of the domain-specific repair rules to the candidate string to satisfy the rules of the context-free grammar. The method further comprises configuring (FIG. 2, 208) the language-agnostic computer program repair engine generator to cause the repair engine to calculate a plurality of differences between the candidate string and the plurality of respective repaired strings. The method further comprises configuring (FIG. 2, 210) the language-agnostic computer program repair engine generator to cause the repair engine to replace the candidate string with a designated repaired string, which is selected from the plurality of repaired strings, based at least in part on the difference between the designated repaired string and the candidate string being less than or equal to a difference threshold.

(B2) In the method of B1, wherein at least one domain-specific repair rule indicates a change that is to be performed with regard to the at least one identified token in the candidate string in the computer program based at least in part on the state of the parser as a result of the at least one identified token violating the context-free grammar.

(B3) In the method of any of B1-B2, wherein at least one domain-specific repair rule indicates a change that is to be performed with regard to the at least one identified token in the candidate string in the computer program based at least in part on the state of the parser as a result of the at least one identified token violating a criterion for a valid computer program.

(B4) In the method of any of B1-B3, further comprising: configuring the language-agnostic computer program repair engine generator to cause the repair engine to use a language model to assign a plurality of rankings to the plurality of respective repaired strings based at least in part on a plurality of respective likelihoods of the plurality of respective repaired strings to be written by a human; wherein configuring the language-agnostic computer program repair engine generator to cause the repair engine to replace the candidate string with the designated repaired string comprises: configuring the language-agnostic computer program repair engine generator to cause the repair engine to replace the candidate string with the designated repaired string further based at least in part on the ranking that is assigned to the designated repaired string being no less than the ranking assigned to each other repaired string in the plurality of repaired strings.

(B5) In the method of any of B1-B4, further comprising: configuring the language-agnostic computer program repair engine generator to cause the repair engine to trigger display of a confidence rating to a user as a result of the designated repaired string being selected from the plurality of repaired strings, the confidence rating indicating a confidence that the designated repaired string corresponds to an intent of the user, the confidence rating being directly proportional to the ranking that is assigned to the designated repaired string.

(B6) In the method of any of B1-B5, further comprising: configuring the language-agnostic computer program repair engine generator to cause the repair engine to use a language model to determine the change that is to be performed with regard to the at least one identified token in the candidate string in the computer program based at least in part on the state of the parser.

(B7) In the method of any of B1-B6, wherein annotating the context-free grammar comprises: annotating a plurality of context-free grammars, which describe a plurality of respective syntaxes of a plurality of respective programming languages, with a plurality of respective sets of annotations, each set of annotations identifying tokens that are likely to be included in or excluded from a computer program in a manner that violates the respective context-free grammar; and wherein creating the language-agnostic computer program repair engine generator comprises: creating the language-agnostic computer program repair engine generator that is configured to generate a plurality of parsers, which are configured to process strings of the computer program according to the plurality of respective context-free grammars by triggering calls to domain-agnostic edit operations over tokens in the computer program based on the plurality of respective sets of the annotations and to a plurality of respective sets of domain-specific repair rules, each domain-agnostic edit operation and each domain-specific repair rule in each set indicating a change that is to be performed with regard to at least one identified token in a candidate string in the computer program based at least in part on the state of the respective parser, the state of each parser indicating which tokens in the candidate string precede the at least one identified token and which rules of the respective context-free grammar have been applied to the candidate string prior to the change being performed with regard to the at least one identified token.

(B8) In the method of any of B1-B7, wherein creating the language-agnostic computer program repair engine generator comprises: configuring the language-agnostic computer program repair engine generator to create a plurality of repair engines such that each repair engine converts the candidate string into a corresponding plurality of repaired strings that do not violate the respective context-free grammar and that do not violate a criterion for a valid computer program by applying, for each repaired string, at least one of one or more of the domain-agnostic edit operations or one or more of the domain-specific repair rules to the candidate string to satisfy the rules of the respective context-free grammar; wherein configuring the language-agnostic computer program repair engine generator to cause the repair engine to calculate the plurality of differences comprises: configuring the language-agnostic computer program repair engine generator to cause each of the plurality of repair engines to calculate a plurality of differences between the candidate string and the corresponding plurality of respective repaired strings; and wherein configuring the language-agnostic computer program repair engine generator to cause the repair engine to replace the candidate string with the designated repaired string comprises: configuring the language-agnostic computer program repair engine generator to cause each of the plurality of repair engines to replace the candidate string with a respective designated repaired string, which is selected from the corresponding plurality of repaired strings, based at least in part on the difference between the respective designated repaired string and the candidate string being less than or equal to a difference threshold.

(B9) In the method of any of B1-B8, further comprising: configuring the language-agnostic computer program repair engine generator to cause the repair engine to limit which of the tokens in the candidate string are to be analyzed for compliance with the rules in the context-free grammar to a subsequence of the tokens in the candidate string; wherein the subsequence includes fewer than all of the tokens in the candidate string; and wherein the subsequence is based at least in part on a relative position of each token in the candidate string that is annotated with at least one of the one or more annotations.

(B10) In the method of any of B1-B9, further comprising: configuring the language-agnostic computer program repair engine generator to cause the repair engine to trigger display of the designated repaired string to a user as a result of the designated repaired string being selected from the plurality of repaired strings.

(B11) In the method of any of B1-B10, further comprising: configuring the language-agnostic computer program repair engine generator to cause the repair engine to trigger display of a confidence rating to a user as a result of the designated repaired string being selected from the plurality of repaired strings, the confidence rating indicating a confidence that the designated repaired string corresponds to an intent of the user, the confidence rating being inversely proportional to the difference between the designated repaired string and the candidate string.

(C1) An example computer program product (FIG. 16, 1618, 1622) comprising a computer-readable storage medium having instructions recorded thereon for enabling a processor-based system (FIG. 1, 102A-102M or 106A-106N; FIG. 5, 500; FIG. 16, 1600) to perform operations. The operations comprise annotating (FIG. 2, 202) a context-free grammar (FIG. 5, 538), which describes a syntax of a programming language, with one or more annotations, each annotation identifying a token that is likely to be included in or excluded from a computer program in a manner that violates the context-free grammar. The operations further comprise creating (FIG. 2, 204) a language-agnostic computer program repair engine generator (FIG. 5, 534) that is configured to generate a parser, which is configured to process strings of the computer program according to the context-free grammar by triggering calls to domain-agnostic edit operations over tokens in the computer program based on the one or more annotations and to domain-specific repair rules (FIG. 5, 536). Each domain-agnostic edit operation and each domain-specific repair rule indicates a change that is to be performed with regard to at least one identified token in a candidate string in the computer program based at least in part on a state of the parser. The state of the parser indicates which tokens in the candidate string precede the at least one identified token and which rules of the context-free grammar have been applied to the candidate string prior to the change being performed with regard to the at least one identified token. The operations further comprise configuring (FIG. 2, 206) the language-agnostic computer program repair engine generator to create a repair engine that converts the candidate string into a plurality of repaired strings that do not violate the context-free grammar and that do not violate a criterion for a valid computer program by applying, for each repaired string, at least one of one or more of the domain-agnostic edit operations or one or more of the domain-specific repair rules to the candidate string to satisfy the rules of the context-free grammar. The operations further comprise configuring (FIG. 2, 208) the language-agnostic computer program repair engine generator to cause the repair engine to calculate a plurality of differences between the candidate string and the plurality of respective repaired strings. The operations further comprise configuring (FIG. 2, 210) the language-agnostic computer program repair engine generator to cause the repair engine to replace the candidate string with a designated repaired string, which is selected from the plurality of repaired strings, based at least in part on the difference between the designated repaired string and the candidate string being less than or equal to a difference threshold.

IV. Example Computer System

FIG. 16 depicts an example computer 1600 in which embodiments may be implemented. Any one or more of the user devices 102A-102M and/or any one or more of the servers 106A-106N shown in FIG. 1 and/or computing system 500 shown in FIG. 5 may be implemented using computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing any one or more of (e.g., at least a portion of) the language-agnostic engine generator creation logic 108, the language-agnostic engine generator creation logic 508, the annotation logic 512, the configuration logic 514, the parser logic 516, the conversion logic 518, the difference logic 520, the replacement logic 522, the ranking logic 524, the display logic 526, the change determination logic 528, the limitation logic 530, flowchart 200 (including any step of flowchart 200), flowchart 300 (including any step of flowchart 300), and/or flowchart 400 (including any step of flowchart 400), as described herein.

A user may enter commands and information into the computer 1600 through input devices such as keyboard 1638 and pointing device 1640. Other input devices (not shown) may include a microphone, joystick, game pad, satellite dish, scanner, touch screen, camera, accelerometer, gyroscope, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 (e.g., a monitor) is also connected to bus 1606 via an interface, such as a video adapter 1646. In addition to display device 1644, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable storage medium" are used to generally refer to media (e.g., non-transitory media) such as the hard disk associated with hard disk drive 1614, removable magnetic disk 1618, removable optical disk 1622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments discussed herein. Accordingly, such computer programs represent controllers of the computer 1600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a memory; and
a processing system coupled to the memory, the processing system configured to:
annotate a context-free grammar, which describes a syntax of a programming language, with an annotation, the annotation identifying a token that is likely to be included in or excluded from a computer program in a manner that violates the context-free grammar;
create a language-agnostic computer program repair engine generator that is configured to generate a parser, which is configured to process strings of the computer program according to the context-free grammar by triggering calls to domain-agnostic edit operations over tokens in the computer program based on the annotation and to domain-specific repair rules, each domain-agnostic edit operation and each domain-specific repair rule indicating a change that is to be performed with regard to at least one identified token in a candidate string in the computer program based at least in part on a state of the parser, the state of the parser indicating which tokens in the candidate string precede the at least one identified token and which rules of the context-free grammar have been applied to the candidate string prior to the change being performed with regard to the at least one identified token;
configure the language-agnostic computer program repair engine generator to create a repair engine that converts the candidate string into a plurality of repaired strings that do not violate the context-free grammar and that do not violate a criterion for a valid computer program by applying, for each repaired string, at least one of one or more of the domain-agnostic edit operations or one or more of the domain-specific repair rules to the candidate string to satisfy the rules of the context-free grammar;
configure the language-agnostic computer program repair engine generator to cause the repair engine to calculate a plurality of differences between the candidate string and the plurality of respective repaired strings; and
configure the language-agnostic computer program repair engine generator to cause the repair engine to replace the candidate string with a designated repaired string, which is selected from the plurality of repaired strings, based at least in part on the difference between the designated repaired string and the candidate string being less than or equal to a difference threshold.

2. The system of claim 1, wherein at least one domain-specific repair rule indicates a change that is to be performed with regard to the at least one identified token in the candidate string in the computer program based at least in part on the state of the parser as a result of the at least one identified token violating the context-free grammar.

3. The system of claim 1, wherein at least one domain-specific repair rule indicates a change that is to be performed with regard to the at least one identified token in the candidate string in the computer program based at least in part on the state of the parser as a result of the at least one identified token violating a criterion for a valid computer program.

4. The system of claim 1, wherein the processing system is configured to:

configure the language-agnostic computer program repair engine generator to cause the repair engine to use a language model to assign a plurality of rankings to the plurality of respective repaired strings based at least in part on a plurality of respective likelihoods of the plurality of respective repaired strings to be written by a human; and configure the language-agnostic computer program repair engine generator to cause the repair engine to replace the candidate string with the designated repaired string further based at least in part on the ranking that is assigned to the designated repaired string being no less than the ranking assigned to each other repaired string in the plurality of repaired strings.

5. The system of claim 4, wherein the processing system is further configured to:

configure the language-agnostic computer program repair engine generator to cause the repair engine to trigger display of a confidence rating to a user as a result of the designated repaired string being selected from the plurality of repaired strings, the confidence rating indicating a confidence that the designated repaired string corresponds to an intent of the user, the confidence rating being directly proportional to the ranking that is assigned to the designated repaired string.

6. The system of claim 1, wherein the processing system is further configured to:

configure the language-agnostic computer program repair engine generator to cause the repair engine to use a language model to determine the change that is to be performed with regard to the at least one identified token in the candidate string in the computer program based at least in part on the state of the parser.

7. The system of claim 1, wherein the processing system is configured to:

annotate a plurality of context-free grammars, which describe a plurality of respective syntaxes of a plurality of respective programming languages, with a plurality of respective sets of annotations, each set of annotations identifying tokens that are likely to be included in or excluded from a computer program in a manner that violates the respective context-free grammar; and create a language-agnostic computer program repair engine generator that is configured to generate a plurality of parsers, which are configured to process strings of the computer program according to the plurality of respective context-free grammars by triggering calls to domain-agnostic edit operations over tokens in the computer program based on the plurality of respective sets of the annotations and to a plurality of respective sets of domain-specific repair rules, each domain-agnostic edit operation and each domain-specific repair rule in each set indicating a change that is to be performed with regard to at least one identified token in a candidate string in the computer program based at least in part on the state of the respective parser, the state of each parser indicating which tokens in the candidate string precede the at least one identified token and which rules of the respective context-free grammar have been applied to the candidate string prior to the change being performed with regard to the at least one identified token.

8. The system of claim 7, wherein the processing system is configured to:

configure the language-agnostic computer program repair engine generator to create a plurality of repair engines such that each repair engine converts the candidate string into a corresponding plurality of repaired strings that do not violate the respective context-free grammar and that do not violate a criterion for a valid computer program by applying, for each repaired string, at least one of one or more of the domain-agnostic edit operations or one or more of the domain-specific repair rules to the candidate string to satisfy the rules of the respective context-free grammar;

configure the language-agnostic computer program repair engine generator to cause each of the plurality of repair engines to calculate a plurality of differences between the candidate string and the corresponding plurality of respective repaired strings; and configure the language-agnostic computer program repair engine generator to cause each of the plurality of repair engines to replace the candidate string with a respective designated repaired string, which is selected from the corresponding plurality of repaired strings, based at least in part on the difference between the respective designated repaired string and the candidate string being less than or equal to a difference threshold.

9. The system of claim 1, wherein the processing system is further configured to:

configure the language-agnostic computer program repair engine generator to cause the repair engine to limit which of the tokens in the candidate string are to be analyzed for compliance with the rules in the context-free grammar to a subsequence of the tokens in the candidate string;

wherein the subsequence includes fewer than all of the tokens in the candidate string; and wherein the subsequence is based at least in part on a relative position of each token in the candidate string that is annotated with the annotation.

10. The system of claim 1, wherein the processing system is further configured to:

configure the language-agnostic computer program repair engine generator to cause the repair engine to trigger display of the designated repaired string to a user as a result of the designated repaired string being selected from the plurality of repaired strings.

11. The system of claim 1, wherein the processing system is further configured to:

configure the language-agnostic computer program repair engine generator to cause the repair engine to trigger display of a confidence rating to a user as a result of the designated repaired string being selected from the plurality of repaired strings, the confidence rating indicating a confidence that the designated repaired string corresponds to an intent of the user, the confidence rating being inversely proportional to the difference between the designated repaired string and the candidate string.

12. A method implemented by a computing system, the method comprising:

annotating a context-free grammar, which describes a syntax of a programming language, with an annotation, the annotation identifying a token that is likely to be included in or excluded from a computer program in a manner that violates the context-free grammar;

creating a language-agnostic computer program repair engine generator that is configured to generate a parser, which is configured to process strings of the computer program according to the context-free grammar by triggering calls to domain-agnostic edit operations over tokens in the computer program based on the annotation and to domain-specific repair rules, each domain-agnostic edit operation and each domain-specific repair rule indicating a change that is to be performed with regard to at least one identified token in a candidate string in the computer program based at least in part on a state of the parser, the state of the parser indicating which tokens in the candidate string precede the at least one identified token and which rules of the context-free grammar have been applied to the candidate string prior to the change being performed with regard to the at least one identified token;

configuring the language-agnostic computer program repair engine generator to create a repair engine that converts the candidate string into a plurality of repaired strings that do not violate the context-free grammar and that do not violate a criterion for a valid computer program by applying, for each repaired string, at least one of one or more of the domain-agnostic edit operations or one or more of the domain-specific repair rules to the candidate string to satisfy the rules of the context-free grammar;

configuring the language-agnostic computer program repair engine generator to cause the repair engine to calculate a plurality of differences between the candidate string and the plurality of respective repaired strings; and configuring the language-agnostic computer program repair engine generator to cause the repair engine to replace the candidate string with a designated repaired string, which is selected from the plurality of repaired strings, based at least in part on the difference between the designated repaired string and the candidate string being less than or equal to a difference threshold.

13. The method of claim 12, further comprising:
configuring the language-agnostic computer program repair engine generator to cause the repair engine to use a language model to assign a plurality of rankings to the plurality of respective repaired strings based at least in part on a plurality of respective likelihoods of the plurality of respective repaired strings to be written by a human;
wherein configuring the language-agnostic computer program repair engine generator to cause the repair engine to replace the candidate string with the designated repaired string comprises:
configuring the language-agnostic computer program repair engine generator to cause the repair engine to replace the candidate string with the designated repaired string further based at least in part on the ranking that is assigned to the designated repaired string being no less than the ranking assigned to each other repaired string in the plurality of repaired strings.

14. The method of claim 13, further comprising:
configuring the language-agnostic computer program repair engine generator to cause the repair engine to trigger display of a confidence rating to a user as a result of the designated repaired string being selected from the plurality of repaired strings, the confidence rating indicating a confidence that the designated repaired string corresponds to an intent of the user, the confidence rating being directly proportional to the ranking that is assigned to the designated repaired string.

15. The method of claim 12, further comprising:
configuring the language-agnostic computer program repair engine generator to cause the repair engine to use a language model to determine the change that is to be performed with regard to the at least one identified token in the candidate string in the computer program based at least in part on the state of the parser.

16. The method of claim 12, wherein annotating the context-free grammar comprises:
annotating a plurality of context-free grammars, which describe a plurality of respective syntaxes of a plurality of respective programming languages, with a plurality of respective sets of annotations, each set of annotations identifying tokens that are likely to be included in or excluded from a computer program in a manner that violates the respective context-free grammar;
wherein creating the language-agnostic computer program repair engine generator comprises:
creating the language-agnostic computer program repair engine generator that is configured to generate a plurality of parsers, which are configured to process strings of the computer program according to the plurality of respective context-free grammars by triggering calls to domain-agnostic edit operations over tokens in the computer program based on the plurality of respective sets of the annotations and to a plurality of respective sets of domain-specific repair rules, each domain-agnostic edit operation and each domain-specific repair rule in each set indicating a change that is to be performed with regard to at least one identified token in a candidate string in the computer program based at least in part on the state of the respective parser, the state of each parser indicating which tokens in the candidate string precede the at least one identified token and which rules of the respective context-free grammar have been applied to the candidate string prior to the change being performed with regard to the at least one identified token;
wherein creating the language-agnostic computer program repair engine generator comprises:
configuring the language-agnostic computer program repair engine generator to create a plurality of repair engines such that each repair engine converts the candidate string into a corresponding plurality of repaired strings that do not violate the respective context-free grammar and that do not violate a criterion for a valid computer program by applying, for each repaired string, at least one of one or more of the domain-agnostic edit operations or one or more of the domain-specific repair rules to the candidate string to satisfy the rules of the respective context-free grammar;
wherein configuring the language-agnostic computer program repair engine generator to cause the repair engine to calculate the plurality of differences comprises:
configuring the language-agnostic computer program repair engine generator to cause each of the plurality of repair engines to calculate a plurality of differences between the candidate string and the corresponding plurality of respective repaired strings; and
wherein configuring the language-agnostic computer program repair engine generator to cause the repair engine to replace the candidate string with the designated repaired string comprises:
configuring the language-agnostic computer program repair engine generator to cause each of the plurality of repair engines to replace the candidate string with a respective designated repaired string, which is selected from the corresponding plurality of repaired strings, based at least in part on the difference between the respective designated repaired string and the candidate string being less than or equal to a difference threshold.

17. The method of claim 12, further comprising:

configuring the language-agnostic computer program repair engine generator to cause the repair engine to limit which of the tokens in the candidate string are to be analyzed for compliance with the rules in the context-free grammar to a subsequence of the tokens in the candidate string;

wherein the subsequence includes fewer than all of the tokens in the candidate string; and wherein the subsequence is based at least in part on a relative position of each token in the candidate string that is annotated with the annotation.

18. The method of claim 12, further comprising:

configuring the language-agnostic computer program repair engine generator to cause the repair engine to trigger display of the designated repaired string to a user as a result of the designated repaired string being selected from the plurality of repaired strings.

19. The method of claim 12, further comprising:

configuring the language-agnostic computer program repair engine generator to cause the repair engine to trigger display of a confidence rating to a user as a result of the designated repaired string being selected from the plurality of repaired strings, the confidence rating indicating a confidence that the designated repaired string corresponds to an intent of the user, the confidence rating being inversely proportional to the difference between the designated repaired string and the candidate string.

20. A computer program product comprising a computer-readable storage medium having instructions recorded thereon for enabling a processor-based system to perform operations, the operations comprising:

annotating a context-free grammar, which describes a syntax of a programming language, with an annotation, the annotation identifying a token that is likely to be included in or excluded from a computer program in a manner that violates the context-free grammar;

creating a language-agnostic computer program repair engine generator that is configured to generate a parser, which is configured to process strings of the computer program according to the context-free grammar by triggering calls to domain-agnostic edit operations over tokens in the computer program based on the annotation and to domain-specific repair rules, each domain-agnostic edit operation and each domain-specific repair rule indicating a change that is to be performed with regard to at least one identified token in a candidate string in the computer program based at least in part on a state of the parser, the state of the parser indicating which tokens in the candidate string precede the at least one identified token and which rules of the context-free grammar have been applied to the candidate string prior to the change being performed with regard to the at least one identified token;

configuring the language-agnostic computer program repair engine generator to create a repair engine that converts the candidate string into a plurality of repaired strings that do not violate the context-free grammar and that do not violate a criterion for a valid computer program by applying, for each repaired string, at least one of one or more of the domain-agnostic edit operations or one or more of the domain-specific repair rules to the candidate string to satisfy the rules of the context-free grammar;

configuring the language-agnostic computer program repair engine generator to cause the repair engine to calculate a plurality of differences between the candidate string and the plurality of respective repaired strings; and configuring the language-agnostic computer program repair engine generator to cause the repair engine to replace the candidate string with a designated repaired string, which is selected from the plurality of repaired strings, based at least in part on the difference between the designated repaired string and the candidate string being less than or equal to a difference threshold.

* * * * *